Sept. 6, 1955 H. AUGER 2,717,087

MECHANIZED STORAGE APPARATUS

Filed Aug. 16, 1949 9 Sheets-Sheet 1

INVENTOR.
HAROLD AUGER

BY Furman Rinehart

ATTORNEY.

INVENTOR.
HAROLD AUGER
BY Furman Rinehart
ATTORNEY.

Sept. 6, 1955 H. AUGER 2,717,087

MECHANIZED STORAGE APPARATUS

Filed Aug. 16, 1949 9 Sheets-Sheet 3

INVENTOR.

HAROLD AUGER

BY Furman Rinehart

ATTORNEY.

Sept. 6, 1955 H. AUGER 2,717,087

MECHANIZED STORAGE APPARATUS

Filed Aug. 16, 1949 9 Sheets-Sheet 4

INVENTOR.
HAROLD AUGER
BY Furman Rinehart
ATTORNEY.

Sept. 6, 1955 H. AUGER 2,717,087

MECHANIZED STORAGE APPARATUS

Filed Aug. 16, 1949 9 Sheets-Sheet 5

INVENTOR.

HAROLD AUGER

BY Furman Rinehart

ATTORNEY.

MECHANIZED STORAGE APPARATUS

Filed Aug. 16, 1949 9 Sheets-Sheet 6

INVENTOR.
HAROLD AUGER
BY Furman Rinehart
ATTORNEY.

Sept. 6, 1955 H. AUGER 2,717,087

MECHANIZED STORAGE APPARATUS

Filed Aug. 16, 1949 9 Sheets-Sheet 7

INVENTOR.
HAROLD AUGER

BY Furman Rinehart

ATTORNEY.

MECHANIZED STORAGE APPARATUS

INVENTOR.
HAROLD AUGER

BY Furman Rinehart

ATTORNEY.

Sept. 6, 1955 H. AUGER 2,717,087

MECHANIZED STORAGE APPARATUS

Filed Aug. 16, 1949 9 Sheets-Sheet 9

INVENTOR.
HAROLD AUGER

BY Furman Rinehart

ATTORNEY.

2,717,087

MECHANIZED STORAGE APPARATUS

Harold Auger, Boyne Hill, Maidenhead, England

Application August 16, 1949, Serial No. 110,642

Claims priority, application Great Britain August 23, 1948

17 Claims. (Cl. 214—16.1)

This invention relates to mechanized storage apparatus of the type which includes one or more load-carrying wheeled platforms moved about from one position to another in the apparatus. Such platforms may be arranged to circulate in a closed track circuit formed, for example, of two or more parallel ranks of platforms, with cross-overs at either ends of the ranks whereby the platforms are shifted from one rank to the other on cross-carriages. In this manner almost the entire area occupied by the circuit, with the exception of at least one platform space which must be kept empty to permit circulation of the platforms, is available for actual storage.

Circuits of this type may be used for the storage of all kinds of articles, but are especially adapted to the parking and storage of automobiles and other vehicles, particularly in cities where the parking load is high and parking space is scarce and expensive, for these circuits make active use of 75% or more of the total area required, as against only some 45% in the case of manual parking.

My present invention relates to certain improvements in the construction and arrangement of mechanized storage apparatus of the type described, which make it simpler, cheaper, quieter and more reliable. Specifically, my invention relates to a novel compensated and selective rank-drive coupler which cooperates with a simplified form of load-carrying platform, and to a novel cross-carriage which incorporates jacks that raise a platform clear of the tracks in order to shift it between ranks and which thus permits the use of a much simplified rank and cross-over trackage system.

In earlier storage apparatus which I have designed, the longitudinal tracks on which the platforms move the length of the circuit (I call these the "rank tracks") are interrupted at the cross-overs, and those portions of the rank tracks that extend into the crossovers are either moved vertically up and down or horizontally back and forth in order that a platform in the cross-over may be loaded upon the cross-carriage for transfer from one rank to another. By using my new lift-type cross-carriage, however, the rank tracks may extend unbroken from one end of the circuit to the other, and the portions of them in the cross-over may be fixed to the floor in the same manner as the main body of the rank tracks. It also becomes possible for the cross-over tracks, on which the cross-carriages traverse from one rank to another, to be fixed and to be arranged coplanar with the rank tracks. The two sets of tracks intersect in the cross-overs, of course; but since both sets of tracks are coplanar, and since I prefer to have no flanges on the platform wheels or on the cross-carriage wheels, neither the cross-over tracks nor the rank tracks are interrupted at the intersections. Hence as a platform moves into the cross-over, its wheels ride smoothly and quietly on a continuous surface, and the noise and track wear incident to interrupted rank tracks are eliminated.

Each load unit, for example each automobile, each pallet of goods, or each other load that is stored in the circuit, may be accommodated on a single platform, in which event the circuit consists of ranks and cross-overs designed to move single platforms arranged in single trains in each rank. Alternatively, each load unit may be carried on a set of sub-platforms; for example, if automobiles are carried, there may be separate sub-platforms for the front and rear wheels of the vehicle, or for its left and right wheels, or individual sub-platforms for each wheel. In such event, all the sub-platforms of each set are moved in synchronism with each other, and the apparatus will be designed to accommodate such sub-platforms in each rank and in the cross-overs. Unless the context precludes it, in this specification and in the claims appended hereto I intend the word "platform" to include not only the single platform which carries an entire load unit, but also the set of synchronously moved sub-platforms to which I have just referred, or one of such sub-platforms, as the sense of the context indicates.

In my new storage circuit I prefer to use single platforms, each designed to accommodate, for example, an entire automobile or other vehicle. Each such platform may consist of a pair of shelves or troughs connected by transverse bridging members which carry the axles on which the platform wheels are journaled. The troughs may be so spaced that one accommodates the left wheels of the vehicle and the other its right wheels, and the platforms may be close-coupled end to end in each rank, so that the troughs of successive platforms provide a double-track vehicle runway in each rank.

Because of the cross-over gaps in the rank tracks of my previous storage circuits, it was there necessary to provide each platform with closely spaced pairs of wheeled axles, so that one of the pair might take the weight of the platform while the other was crossing a rail gap. Since I am now able to use continuous rank tracks, I am able to dispense with paired axles and to simplify the platform construction by providing only one wheeled axle at each bearing plane. For platforms long enough (about 18 feet) to accommodate present-day passenger automobiles, I prefer to use only two axles, spaced well in from the ends of the platforms so as to avoid excessive sag in the center.

I have found that the overhanging ends of such a platform are so long that, as a vehicle drives on or off, the platform pitches to an undesirable extent. To limit this pitch to a suitably small amount, say an inch or so, I provide depending anti-pitch horns fixed to each platform at its ends, located in line with the rank track rail or other abutment, and extending down to within such distance from the abutment as is equal to the pitch which has been determined to be tolerable in the particular installation.

In order to couple the platforms together in train in each rank, I prefer side-entrance couplers (I call them "platform couplers") of the general plug-and-socket type disclosed in my copending application Ser. No. 764,779, filed July 30, 1947, and which has issued as Patent No. 2,652,162 on September 15, 1953.

Each platform may be provided with a socket coupler member at one end, and a plug coupler assembly at the other end, the plug member of the assembly being carried on a leaf that projects out from the platform. While a platform in the cross-over is traversed from one rank to another, this type of coupler uses the sidewise motion of the moving platform to uncouple the platform from its old rank and then to couple it to the new. In my previous designs, the leaf of the plug coupler member has been pivoted to the platform, but according to my present invention I have simplified the leaf and reduced its cost by constructing it as a cantilever spring, fixed to the platform at one end and carrying the plug at the other. Since the leaf is a spring, it readily accommodates itself to differences in elevation between one platform and the next, a condition which occurs when a platform is lifted by the cross-carriage as described below.

In order to drive the platforms along the ranks I prefer to use a drive modulating mechanism and collector of the general type disclosed in my copending application, Ser. No. 718,737, filed December 27, 1946, and which has issued as Patent No. 2,685,260 on August 3, 1954, specifically, one of the type disclosed in my copending application, Ser. No. 29,913, filed May 28, 1948, and which has issued as Patent No. 2,685,377 on August 3, 1954. But any reciprocating drive mechanism having a stroke equal to the length of one platform space (i. e., the length of one platform plus the space between one platform and the next) will serve the purpose. Suitable coupling means betwen the collector and the platforms in the ranks (I call this means the "collector coupler") imparts the motion of the collector to the platforms.

In the storage apparatus disclosed in my aforesaid applications, Ser. Nos. 718,737 and 29,913, the rank-drive collectors were coupled to the platforms at spaced fixed stations corresponding to the end positions of the collectors; this required actuating means located at each of these stations, as well as gaps in the side flanges of the rank track rails, and long rods and swinging arms connected to each collector. According to my present invention, I continue to engage and disengage the rank platforms at spaced fixed stations corresponding to the ends of the collector stroke, but only a single actuating means is needed and I am able to mount the colletcor coupler and its actuator directly upon the collector, thereby eliminating the long rods and swinging arms. The entire operation takes place clear of the rank tracks, thus eliminating track gaps at the coupling stations.

The actuator for the collector coupler may be of a type which, in addition to being operated by its designed driving means, as for example by the cross-carriage traverse drive, is also operated whenever the collector upon which it is mounted moves. Alternatively, the actuator may be of a type the operation of which is inherently independent of the collector's position or motion. If a collector-influenced actuator is employed, as I prefer to do, it is necessary automatically to compensate it against the movement of the collector, as by providing secondary actuating means for the coupler upon which means the travel of the collector has an influence which is equal and opposite to that imposed on the primary actuator itself by the same travel of the collector. I prefer that the compensator means include a secondary coupler actuating member mounted on the collector and a fixed member operatively engaged with the first member. Thus when the collector is at rest and the primary actuator for the coupler is in operation, the compensator has no effect on the coupler. But when these conditions are reversed (i. e., when the collector is in motion and the coupler drive is at rest), both the primary and secondary actuators are operated equally and in the same direction by, and in proportion to, the travel of the collector; hence during this stage, the operation of the compensator neutralizes the operation of the primary actuator and the coupler is not disturbed.

By such means, therefore, the preferred type of collector coupler also becomes independent of the position or movement of the collector; and when the collector moves in one direction or the other in driving one of the ranks, the coupler remains in engagement with the driven rank during the entire stroke.

The collector coupler itself may consist of a simple latch bar mounted on the collector and lying transverse to the rank tracks. The bar may be reciprocated from side to side, so that in one position one end of it is in driving engagement with a platform in one rank and is entirely free of the adjacent rank, and vice versa in its other position.

In each cross-over of my new storage circuit I provide a cross-carriage which runs on the cross-over tracks, and which is arranged to shift the platforms from one rank to another. Each carriage is built so as to run in under the platform to be shifted, and is equipped with lifts or jacks which then raise the platform from the rank track and thus load it upon the cross-carriage, the platform being lifted only enough to clear the rank track. The carriage, or the jacking frame as I sometimes call it, is then drawn to the other side of the cross-over, where it positions the platform above and in alignment with the new rank track. The jacks are then lowered, and the platform is thus unloaded from the cross-carriage and rests on the new rank track. I sometimes refer to the operation of raising and lowering the jacks of the cross-carriage as "setting the cross-over" or "setting the cross-carriage."

I prefer to dispose the lifts or jacks at the ends or corners of the cros-carriage, and to construct them as mechanical lifts all interconnected to a single actuating member, which may be a central jack-drive shaft mounted on the carriage and operating the jacks by means of toggles and thrust rods; hence all the lifts move in synchronism even though the platform may not be evenly loaded and some of the jacks may consequently be subjected to a larger share of the load than others.

By installing the jacks on the cross-carriage or jacking frame, both the means for lifting the platform (the jacks) and the means for traversing the platform (the cross-carriage itself) move together in the cross-over; hence setting the cross-over requires no movement of any part that is not actually to be traversed with the platform. Since neither the cross-over tracks nor the rank tracks need move, they may be fixed to the floor, with the advantages already described.

Basic characteristics of my new traversing means for inter-rank platform shifting are that this means can be run in under or drawn out from beneath a platform that rests on any rank track in the cross-over, and that this means not only raises and lowers the platform from and to the rank tracks, thus affording the clearance between platform wheels and tracks that is necessary for traversing the carriage through the cross-over, but also effects the traversing. It is thus possible to move the traversing means (the cross-carriage) through the cross-over in an unloaded condition (i. e., free of any platform) while the cross-over is still occupied by a platform or any or all of the rank tracks. I employ the latter feature by causing the cross-carriage to return unloaded to a former rank in order to pick up a second platform, while the platform that has just been traversed to the new rank still rests in the cross-over; this feature is especially important to rapid platform circulation, since it permits the unloaded return of the cross-carriage to take place simultaneously with some other step of the cycle, such as the shift of the collector coupler from one rank to another, whereby the total time for the complete cycle is reduced.

The jack-drive shafts may be operated by any desired and properly phased mechanism, but I prefer to operate them by means actuated from the rank-drive mechanism, so that correct phasing is automatically obtained. It is also necessary that these means offer no obstruction to movement of the platforms on the rank tracks, and so I prefer that such means be located just outside of the ranks, whereby they may engage with the jack-drive shafts when the cross-carriages are on either side of the cross-overs, but are disengaged from the shafts while the carriages traverse the cross-over. Preferably the jack-shaft driving means comprise winding drums operated by cables which are attached to the rank-drive collector and which operate the jack shafts by means of selectively engageable clutches on the shafts and the drums.

In order to traverse the cross-carriages in the cross-overs, I prefer to use a drive modulating mechanism and collector similar to that which I prefer for the rank drive, although any reciprocatory drive mechanism having a stroke equal to the cross-over traverse path will serve. It is also desirable for the traverse drive mechanism to offer no obstruction to movement of the platforms on the rank tracks, and hence I prefer to connect the traverse collector to its associated cross-carriages by means of cables which are so led to and attached to the carriages that the cables are drawn out of one rank as the carriage moves into another.

It will of course be understood that certain features of my present invention may be utilized without taking advantage of all that is herein disclosed. Although such novel features as are believed to be characteristic of the invention are pointed out in the claims appended hereto, the invention itself, as to its objects and advantages, as to the novel features of construction, arrangement and combination of parts in which it resides, and as to the manner in which the invention may be carried out, may be better understood by the following description of a preferred embodiment of my invention applied to a vehicle parking and storage circuit, taken in connection with the accompanying drawings forming a part hereof, in which:

Figure 1:
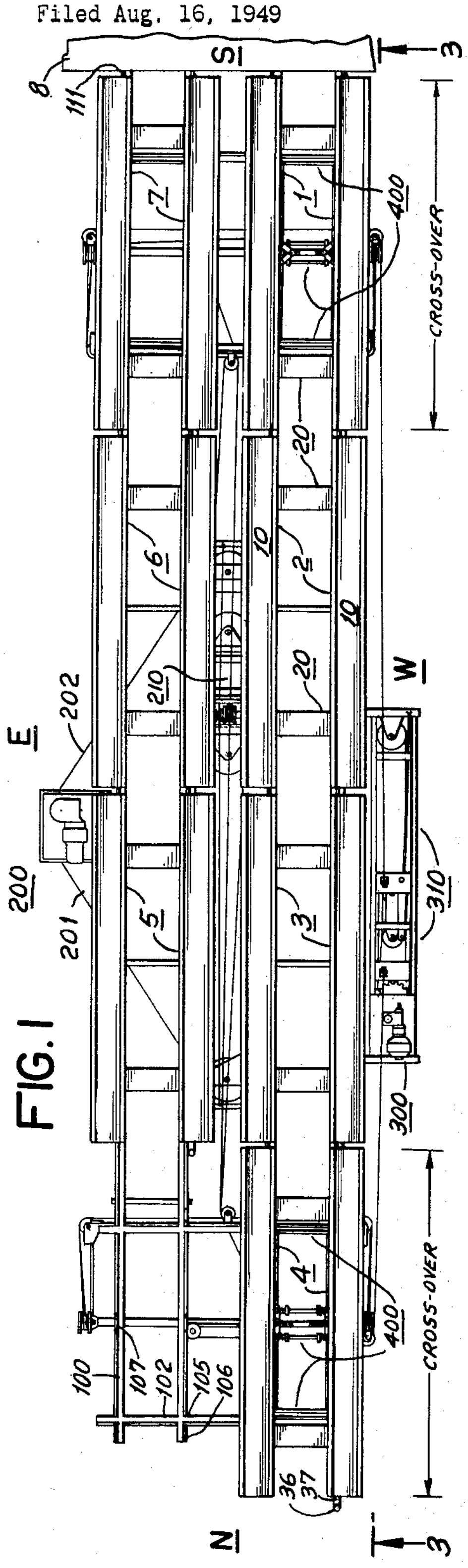
Fig. 1 is a plan view of a complete seven-car vehicle parking and storage circuit of the type described, embodying my present invention.
Figure 4:
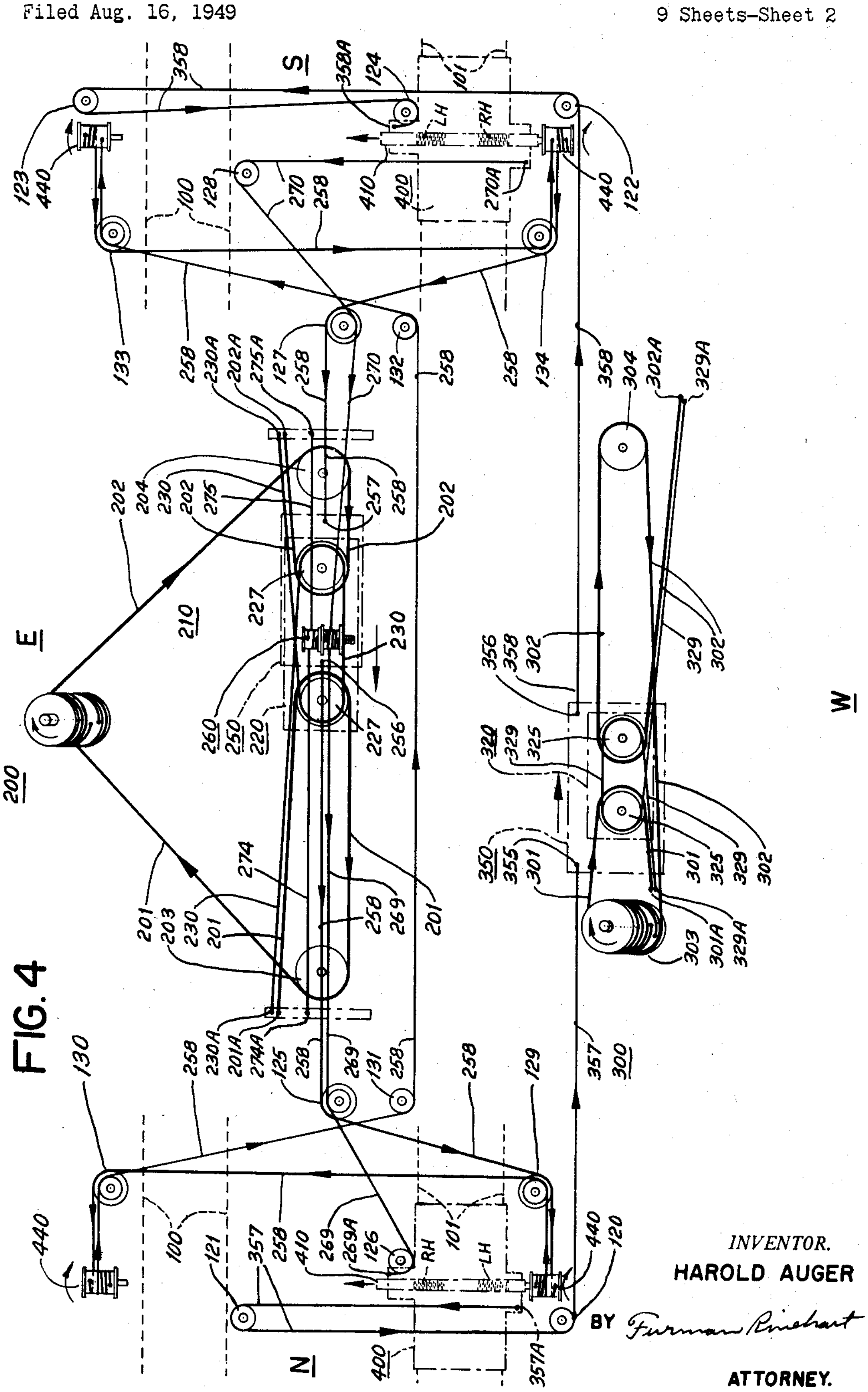
Figure 5:
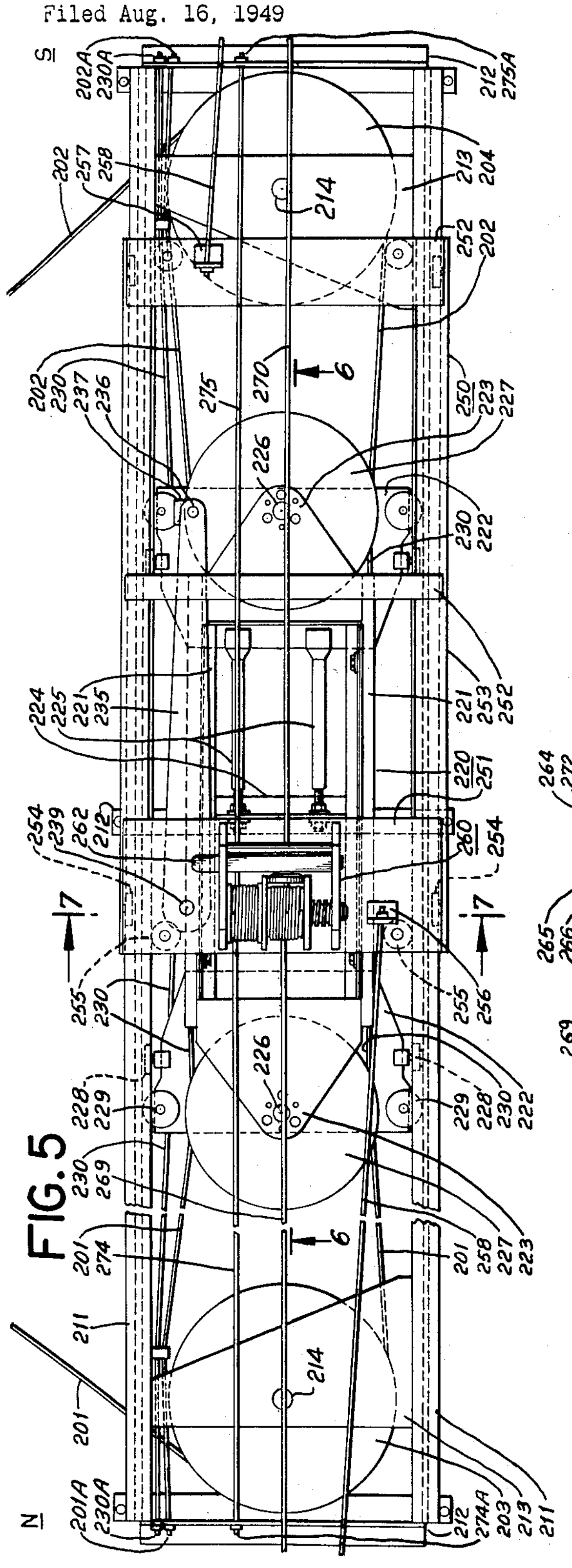
Figure 6:
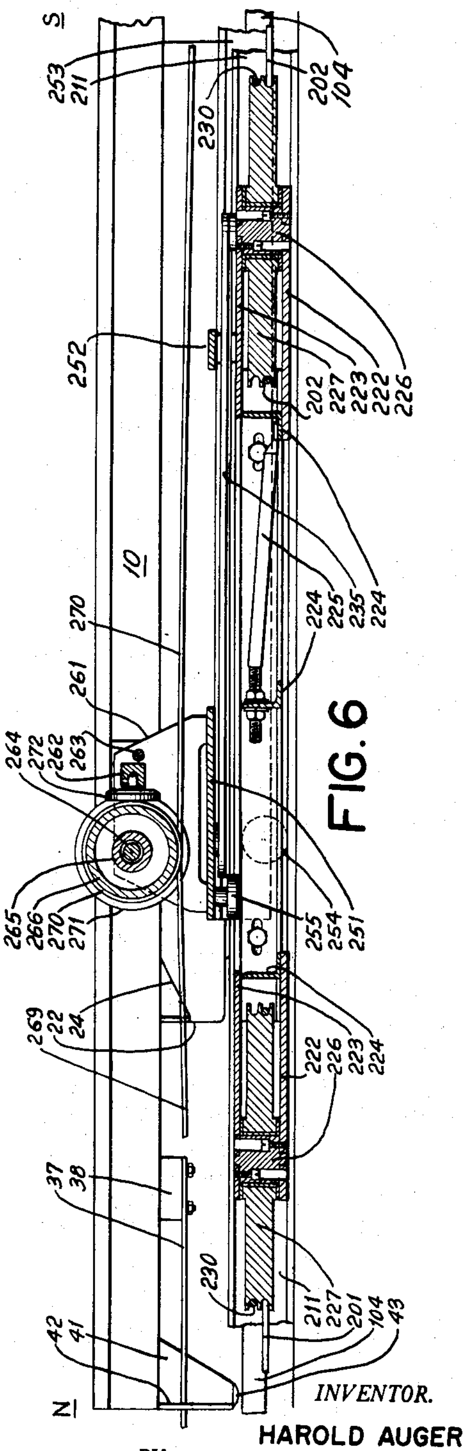
Figures 3A, 7, 8:
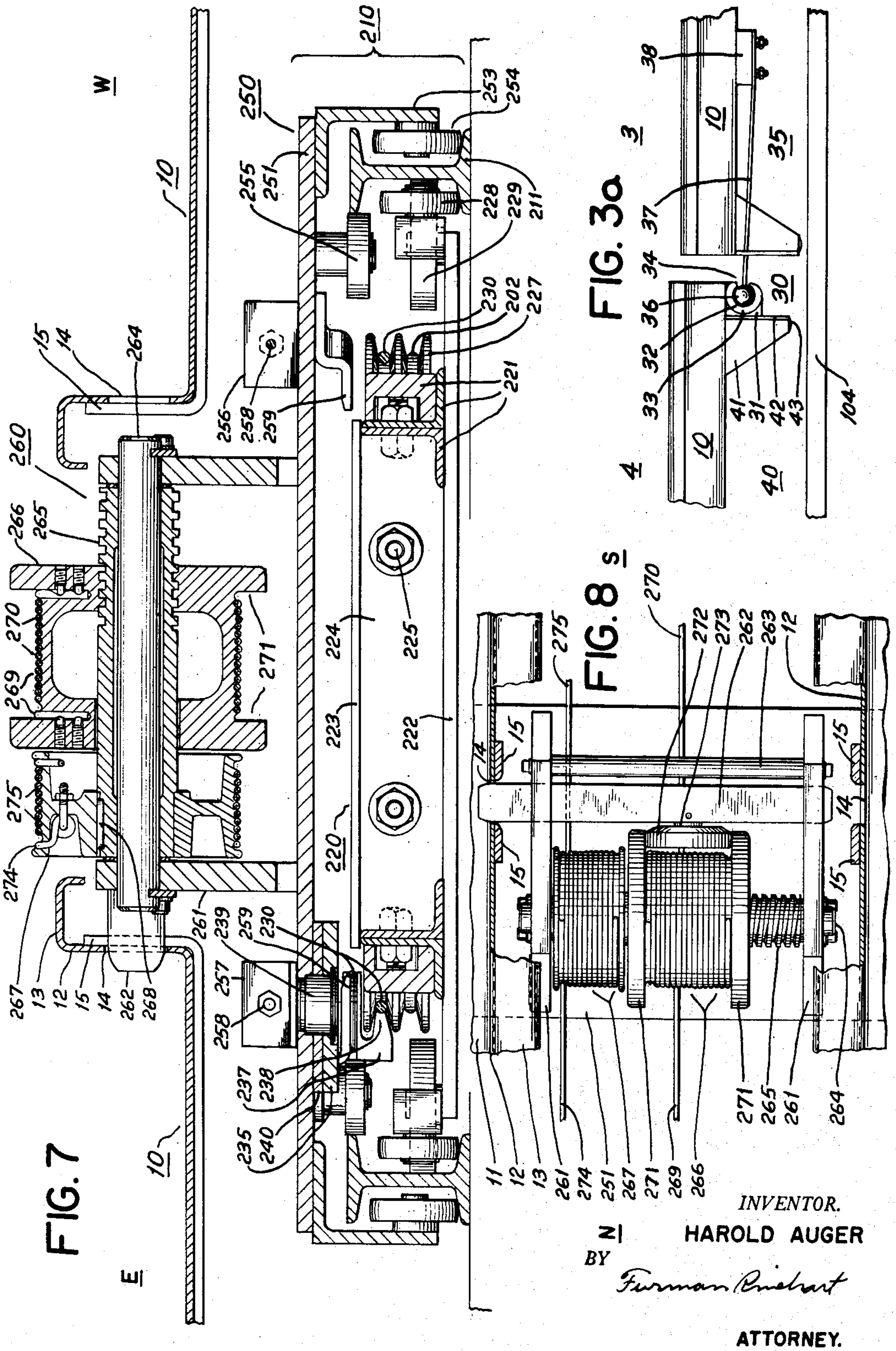
Figure 9:
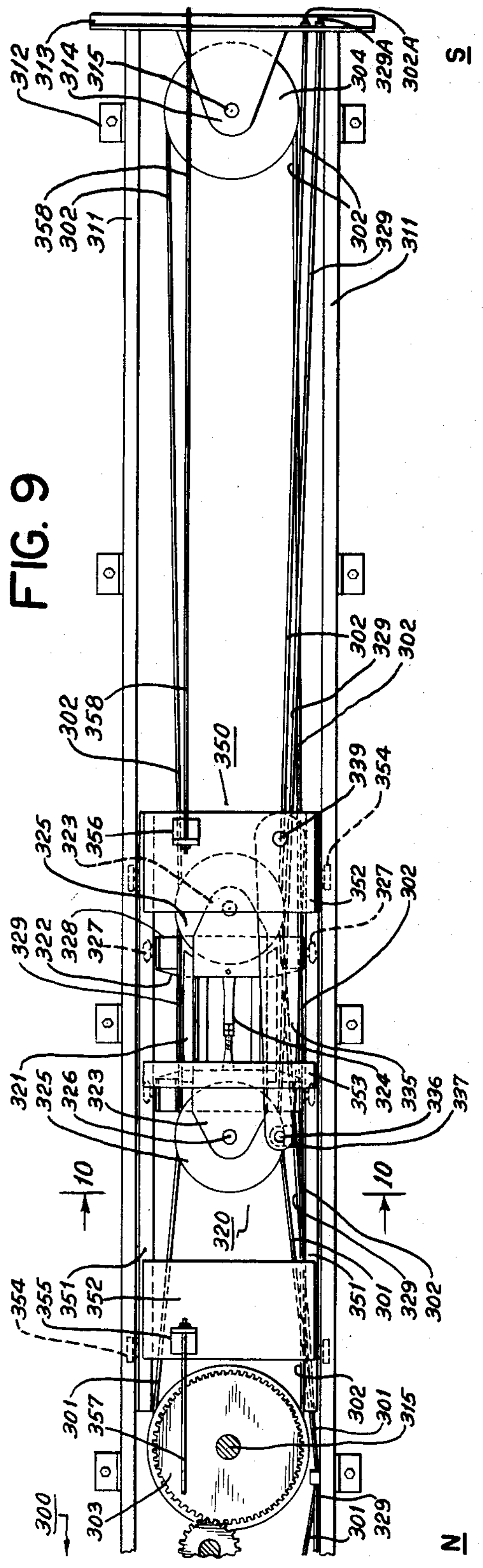
Figure 10:
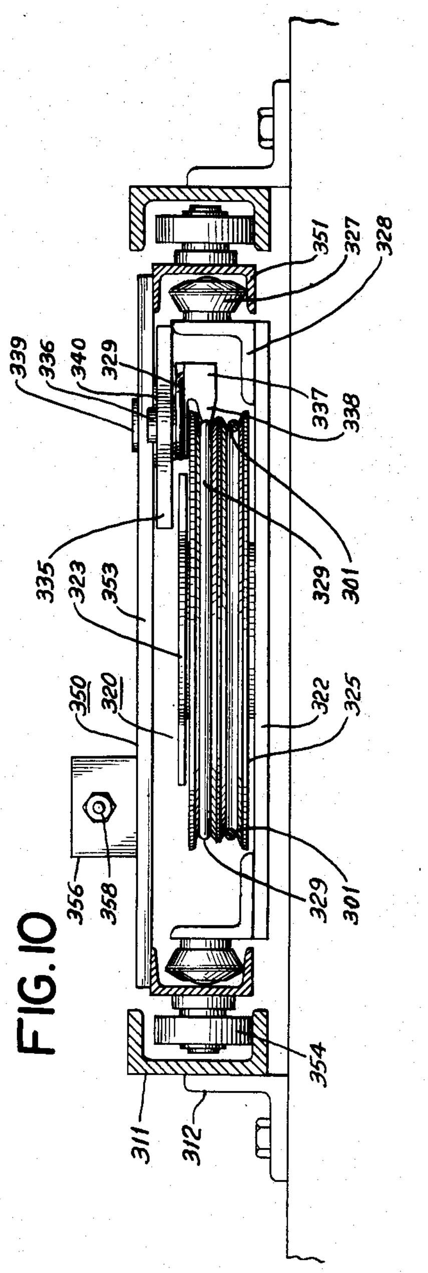
Figure 11:
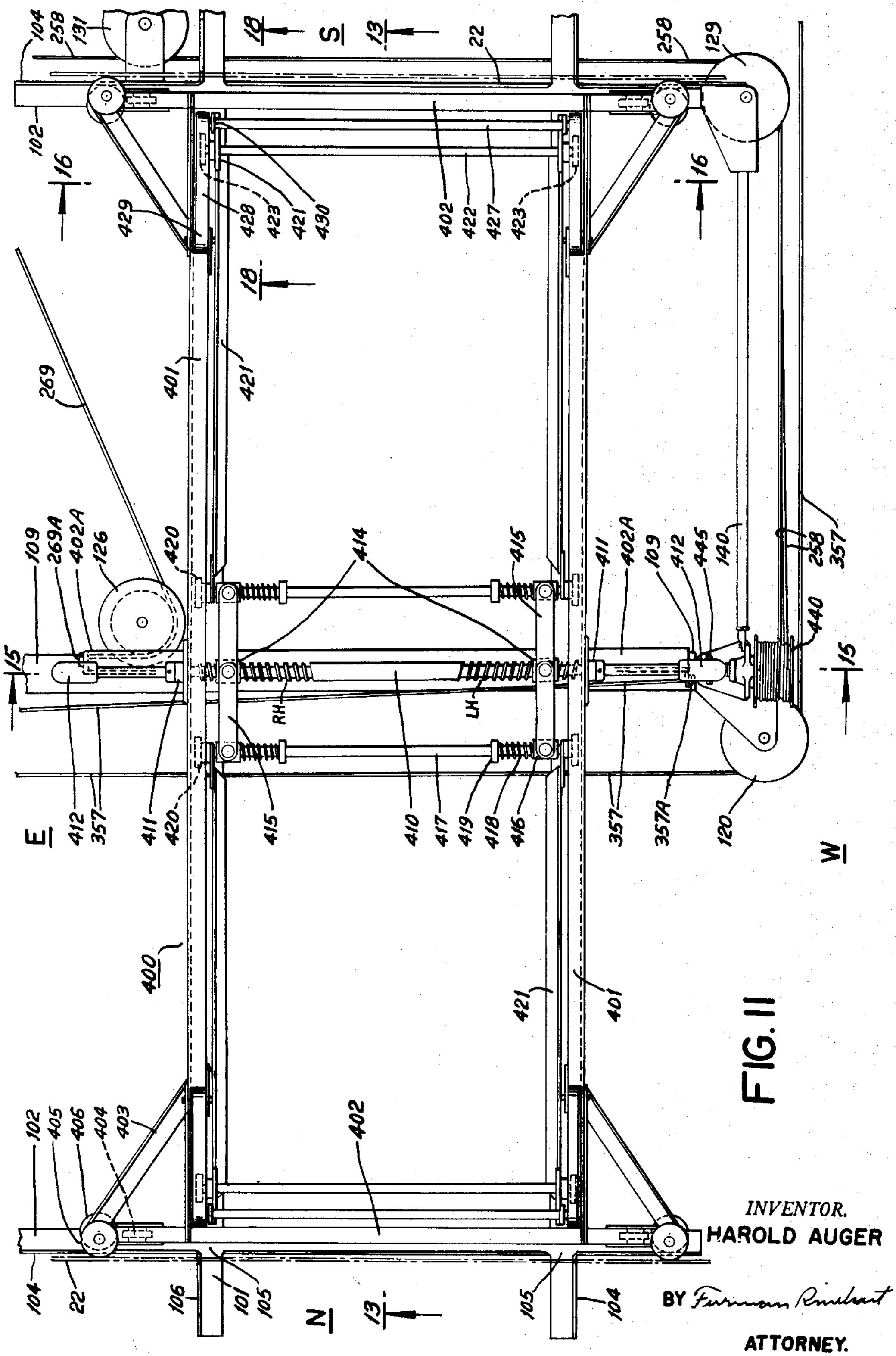
Figure 12:
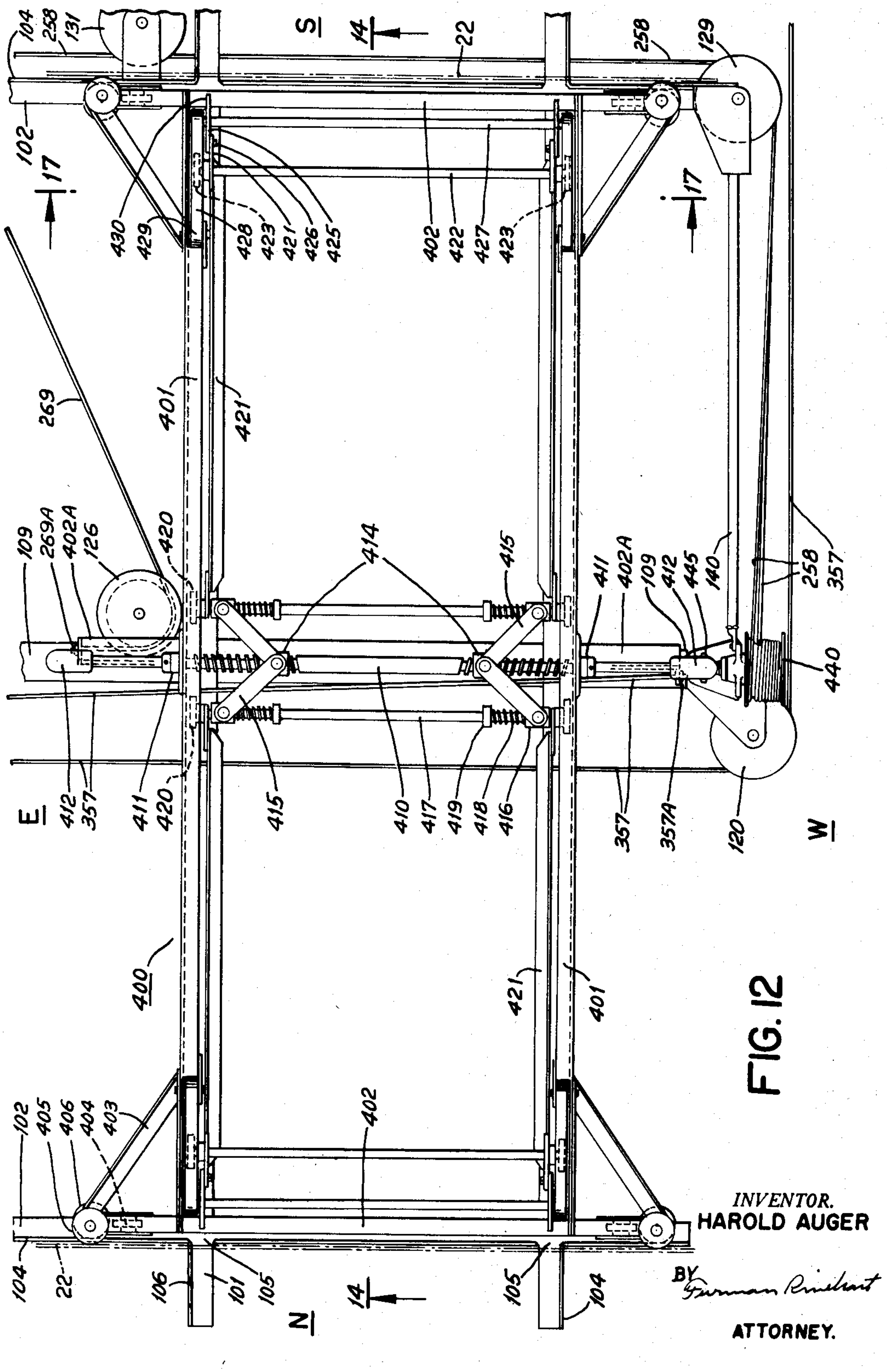
Figures 13, 14, 15:
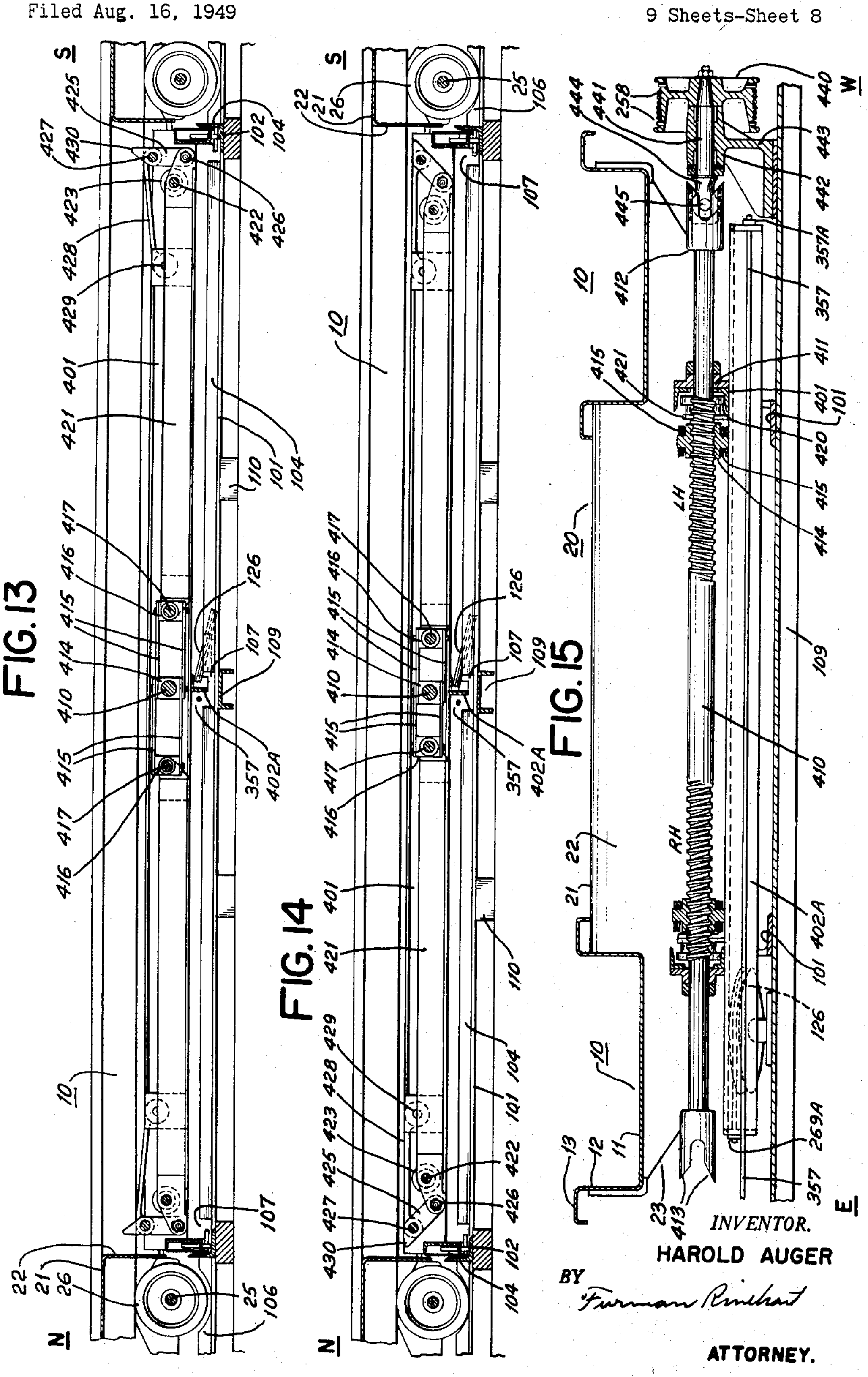
Figure 16:
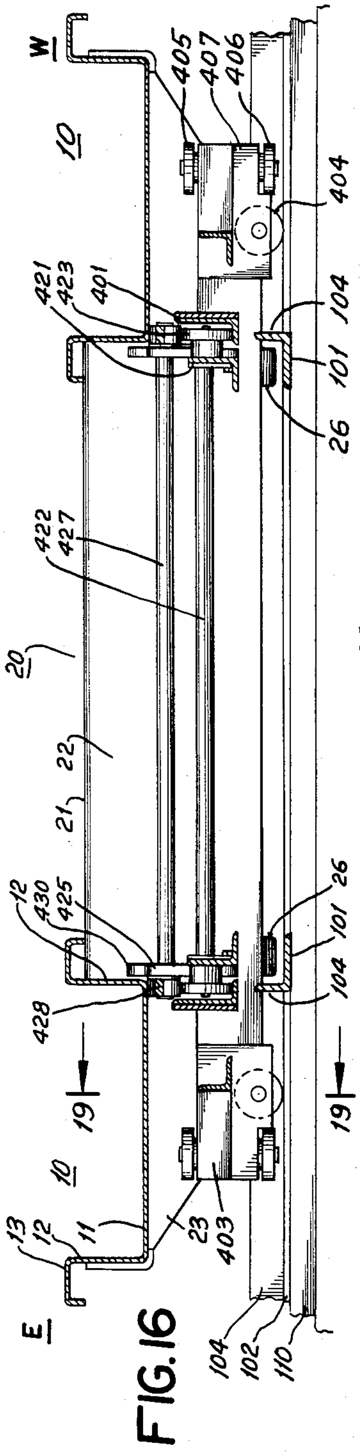
Figure 17:
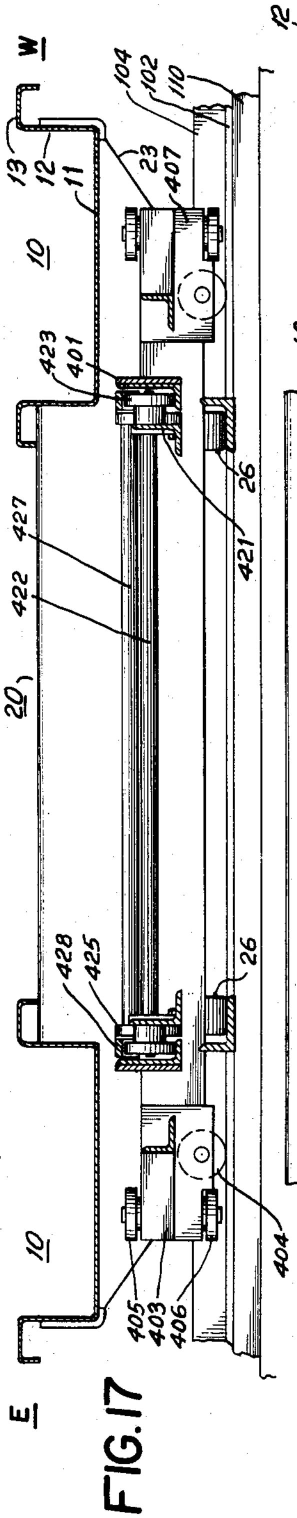
Figure 18:
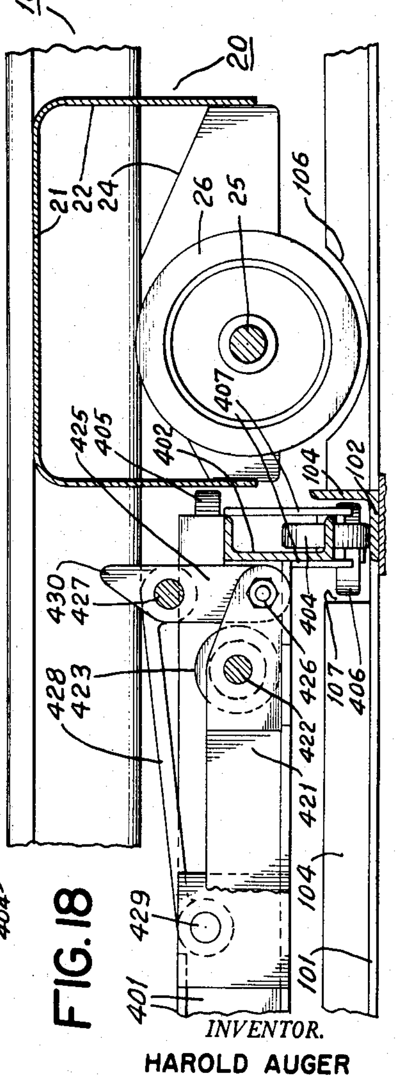
Figure 19:
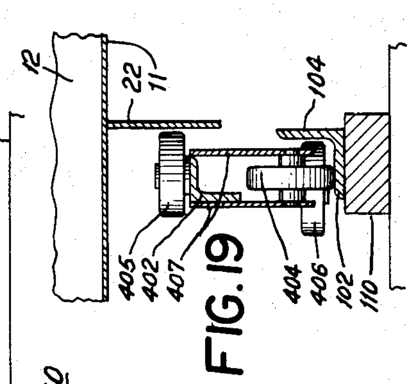

Fig. 3*a* is a detailed elevation of the platform coupler which I prefer to use, and of the anti-pitch horns on the platform ends;

Fig. 4 is a diagrammatic showing of the major elements of the Fig. 1 circuit and of the cables by which these elements are operated;

Figs. 5 and 6 are detailed views of the preferred rank drive mechanism and collector coupler, Fig. 5 being a plan view, and Fig. 6 being a sectional partial view taken along the line 6—6 of Fig. 5;

Fig. 7 is a sectional view of the preferred rank drive mechanism and collector coupler, taken along the line 7—7 of Fig. 5;

Fig. 8 is a detailed plan view of the preferred collector coupler and portions of the adjacent platforms;

Figs. 9 and 10 are detailed views of the preferred traverse drive mechanism, Fig. 9 being a partial plan view, and Fig. 10 being a transverse sectional view taken along the line 10—10 of Fig. 9;

Figs. 11 and 12 are plan views of the north cross-carriage as it lies in the northwest corner of the circuit, Fig. 11 showing the carriage when its jacks are raised and Fig. 12 when the jacks are lowered;

Figs. 13 and 14 are longitudinal sections of the cross-carriage shown in Figs. 11 and 12, Fig. 13 being taken along the line 13—13 of Fig. 11 and showing the jacks raised, and Fig. 14 being taken along the line 14—14 of Fig. 12 and showing the jacks lowered;

Fig. 15 is a transverse central section of the cross-carriage of Fig. 11, taken substantially along the line 15—15 of Fig. 11, but omitting the cross-carriage frame detail and the jacks;

Figs. 16 and 17 are transverse end sections of the cross-carriage of Figs. 11 and 12, Fig. 16 being taken along the line 16—16 of Fig. 11, and Fig. 17 along the line 17—17 of Fig. 12;

Fig. 18 is a detailed longitudinal section of one corner of the cross-carriage of Fig. 11, taken along the line 18—18 of Fig. 11; and Fig. 19 is another detailed longitudinal section at the same corner of the cross-carriage of Fig. 11, along the lines 19—19 of Fig. 16.

Although these drawings have been taken from an actually operating full-size vehicle parking circuit embodying my present invention, it will be understood that they are not working drawings and that, in order to clarify the presentation, especially in the case of the small scale drawings, some elements of the actual apparatus which are not essential to an understanding of my invention have been omitted, such as certain bracing struts in the trackage layout, and that for the same reason certain other elements have been shown somewhat diagrammatically. Since many parts of the structure are duplicated at opposite sides, corners, etc., of the apparatus, I have in some instances applied reference characters only to one or two of the duplicated parts and omitted them from the others.

I have found it convenient, in describing a storage circuit of this type, to employ a directional convention in which one end of the circuit is called the north end, the other the south end, and the two sides the east and the west, respectively. Certain of the drawings have been marked in accordance with this convention, and I shall use it in the description which follows.

Referring first to Fig. 1, the illustrative parking circuit consists of seven platforms 1–7, inclusive, arranged in two parallel ranks extending in the north-south direction. A loading and unloading ramp may be provided at either or both ends of the circuit, a single ramp 8 being shown at the south end in Fig. 1. The areas at the north and south ends of the circuit, for a distance equal to one platform's length from each end, are the cross-overs.

Four of the seven platforms are shown in the west rank and three in the east rank, leaving one platform space vacant in the northeast corner of the circuit, in order to permit circulation. Fig. 1 shows the platforms in their positions at the beginning of a circulation cycle, which may proceed either clockwise or counter-clockwise, depending upon the direction in which the driving motors are operated. Assuming that counter-clockwise circulation is to occur, a complete cycle consists of the following four stages:

1. The east rank, consisting of platforms 5, 6 and 7, moves to the north until platform 5 occupies the vacant space in the northeast corner.
2. Platform 1 traverses the south cross-over from the west rank to the east, occupying the former position of platform 7.
3. The west rank, consisting now only of platforms 2, 3 and 4, moves south until platform 2 occupies the southwest corner.
4. Platform 5 traverses the north cross-over from the east rank to the west, thus occupying the northwest corner.

In this fashion each of the platforms will have advanced counter-clockwise by the distance of one platform space, and circulation may continue in the same fashion until any desired one of the platforms is brought up to the loading and unloading ramp, i. e., occupies the space filled by platform 1 or 7 in Fig. 1. It will be clear without further explanation how similar steps, arranged in slightly different order, effect clockwise circulation.

While Fig. 1 discloses a two-rank circuit four platform spaces in length, it will be understood that this is merely illustrative, and that any desired number of ranks and any desired number of platforms in each rank may be employed, the criteria being the space available, and the maximum time which can be tolerated for the delivery to the unloading ramp of the loads most deeply buried in the circuit.

*Platforms*

In the preferred form, each of the platforms 1–7 (Fig. 1) comprises a pair of longitudinal shelves or troughs 10, 10 rigidly spaced apart by a pair of bridges 20, 20 to which the troughs are fastened, as by welding. Referring especially to Figs. 17 and 18, each trough consists of a runway bottom 11, sides 12 and edge flanges 13, and each bridge 20 consists of a top 21 and downwardly extending sides 22, which form a box-like structure open at the bottom. The upper parts of the end sections of the bridges are cut away to accommodate the troughs 10, and the lower parts of the ends may be cut upwardly as indicated at 23 in Fig. 17. Each bridge carries a pair of transverse plates 24, one below either trough 10. An axle 25 is journaled in each bridge by means of the end plates 24, and platform wheels 26 are journaled on this axle.

I find that two bridges and two pairs of wheels per platform, spaced well in from the ends of the platform as shown in Fig. 1, are suitable for accommodating present-day passenger automobiles. Other types of loads, however, such as trucks or other large vehicles, or pallets of goods, etc., may require additional pairs of wheels in order to carry the weight.

As will be described in more detail below, I prefer to drive the platforms along the ranks by means of a latch bar 262, which engages one of the platforms in the driven rank. This latch bar may either be inserted into the space between adjacent platforms in the rank and simply push against the platform ahead, or, as shown in Figs. 7 and 8, may be inserted into a window 14 in the outer side of each trough 10. Preferably I provide reinforcements 15 alongside each window. As a further alternative, each platform may carry any other desired form of jaw or driving abutment with which or against which the latch bar may engage.

Figure 3:
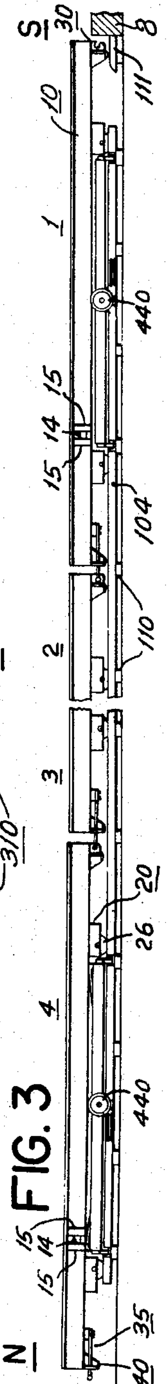
Fig. 3 is an elevation of the circuit of Fig. 1, taken along the line 3—3 of Fig. 1.

As shown in Fig. 3, all of the platforms in each rank are coupled together in train by side-entrance platform couplers of the general plug-and-socket type disclosed in my aforesaid application, Serial No. 764,779. As shown in Fig. 3*a*, where 10, 10 indicate the ends of the troughs of adjacent platforms, a socket member 30 is mounted at one end of each platform, and a plug assembly 35 at the other. The body 31 of the socket member has an internal chamber 32 extending across the rank, a flare 33 at each end, and a slot 34 in its rear face, which parallels chamber 32. The plug assembly 35 comprises a plug member 36 having a cross section complementary to that of chamber 32, the plug being mounted at one end of spring leaf 37, and the other end of the leaf being fixed to the platform as at 38. The slot is wide enough to accommodate the leaf, but will not permit the plug to pass. Consequently, when the couplers of adjacent platforms are engaged in the manner shown in Fig. 3*a*, the platforms are connected together in train. As one platform moves sidewise in traversing the cross-over, however, it will be apparent that its sidewise motion disengages it from the adjacent platform in the old rank and couples it with the adjacent platform in its new rank. Since leaf 37 is a flexible spring the mating sockets and plugs accommodate themselves to normal differences in level between adjacent platforms, which occur when a platform in the end zone is raised for traversing, as shown in Fig. 3*a*.

It will be observed from Fig. 1 that the corresponding troughs of the adjacent platforms in each rank form an almost continuous runway along which vehicles may be driven. Whenever there are several empty platforms extending in line from the loading ramp 8, I prefer to load them by driving the first vehicle across the intervening platforms to the farthest vacant platform, and so on, instead of circulating the platforms about so that each vehicle may be driven onto its own platform directly from the ramp.

Having spaced the platform bridges 20 and platform wheels 26 well in from the platform ends, I have found that, as the front wheels of a vehicle roll onto the platform and as its rear wheels are about to leave, the resulting unbalance of the load causes the platform to pitch, thus making it difficult for a vehicle to drive onto a platform from the loading ramp or to drive from one platform to another. I therefore limit the pitch to such an amount as can be tolerated, which I have found to be of the order of one inch when the platform rests on the rank track, by providing at the end of each trough 10 a depending horn 40 (Figs. 3, 3*a*) which extends down to within a predetermined clearance distance above any desired form of horn abutment, which may be the upper edge of the vertical guide rails 104 (Fig. 3*a*), or the bearing surface of the running rails, or the floor, etc. The clearance distance will of course equal the predetermined tolerable pitch. Each anti-pitch horn may consist of a longitudinal member 41 and a face member 42, which may be welded or otherwise fastened together along their meeting edges, and the horn may terminate in a shoe 43 adapted to contact the horn abutment. If desired, the shoe may take the form of a wheel.

*Trackage*

For the two-rank parking and storage circuit of Fig. 1, I prefer to employ an east rank track composed of horizontal running rails 100 (Fig. 2) and a west rank track composed of similar rails 101. In each cross-over I also provide similar cross rails 102 (north) and 103 (south). I prefer that the running rails be combined with lateral guide rails 104 which define the paths of the platforms and of the cross-carriages, as by forming the rails of simple angle sections (Figs. 16, 19), one leg being horizontal and serving as the running rail and the other leg being vertical and serving as the lateral guide rail. Alternatively, I might form the running rails and the lateral guide rails as separate elements.

Because of the novel design of the cross-carriages 400 which are described below, I am able to fix all of the rank and cross rails to the floor or other supporting structure upon which the circuit rests, and I am therefore able to locate the bearing surfaces of all the running rails at substantially the same level in the areas where they intersect one another so that all such surfaces are coplanar. For the same reason, and also because the platform wheels 26 (Fig. 16) and the cross-carriage wheels 404 (Fig. 19) are preferably unflanged, the bearing portions of the rank and cross rails may continue uninterrupted from end to end, even at the points 105 where the rails intersect. This makes operation of the apparatus much quieter and reduces the wear and tear on the equipment which the track gaps of my earlier designs entailed. In describing the rails as uninterrupted, I do not mean that they may not be made up of lengths of rail with small gaps at the joints, but simply that there are no substantial gaps or breaks in their continuity, such as would cause the platform wheels or cross-carriage wheels to jolt or drop into them as the gaps are encountered.

If desired, flanged running wheels may be used at 26 on the platforms or at 404 on the cross-carriages, or on both the platforms and the carriages. In that event lateral guide rails 104 may be omitted from the tracks on which the flanged wheels run and, in order to pass the flanges, narrow gaps or flange intervals must be cut in the intersected tracks. For example, if the platform wheels 26 are flanged, cross rails 102 and 103 must contain flange intervals. Such intervals may and preferably would be very narrow, so as not to impede the passage of the platform or carriage wheels or to require resort to longitudinally spaced pairs of wheels at each bearing plane on the platforms or carriages.

A storage circuit of the present description does not require a fully-floored structure for its installation, but may be installed in a skeleton frame structure having a minimum of flooring, for example only in the aisles giving access to a group of circuits. For the sake of convenience, however, I shall continue to speak of the "floor" on which the circuit rests, and in so doing mean to include an open frame support of the type just described.

In order that the platforms may traverse the cross-overs without raising the platforms more than enough to clear the running rails, in each cross-over I prefer to cut gaps 106 in the guide rails 104, in order to pass the platform wheels 26. I also cut gaps 107 in rails 104, for the running wheels and transverse frame members of the cross-carriages (Figs. 2, 13, 18).

I may provide cross ties 108 and 109 for the rank rails, the latter being full-width ties in the cross-overs. Although I may fasten the rank and cross rails directly to the floor if it is level, I prefer to raise the tracks on bolsters 110 (Figs. 3, 14), which not only provide adjustment for inaccuracies in the floor, but also permit certain of the driving cables readily to pass underneath the rails. Furthermore, if the floor is level I may dispense with the running rails and permit the platforms and cross-carriages to run directly upon the floor, using only the lateral guide rails 104 to define the platform and carriage paths. This would entail channeling certain of the cables into the floor, and rearranging others overhead.

Figure 2:
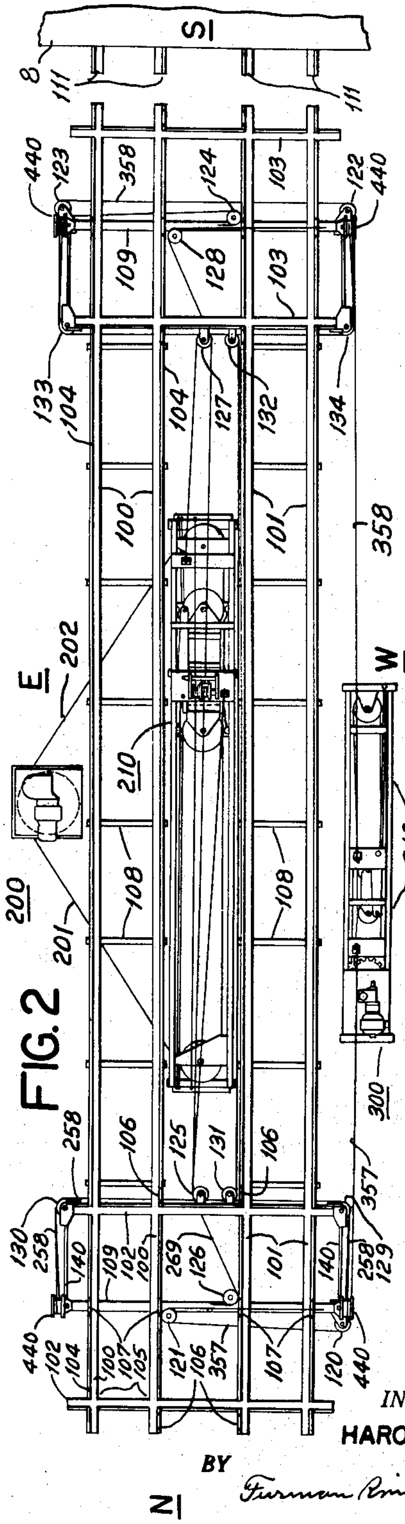
Fig. 2 is a plan view of the circuit of Fig. 1, the platforms and cross-carriages having been removed in order to display the trackage and the locations of the various driving mechanisms.

Since I prefer to arrange the anti-pitch horns 40 so as to make contact with the lateral guide rails 104 of the rank tracks, it is ncessary that these rails extend almost up to the loading and unloading ramp 8 or, as I prefer, that short lengths 111 of angle sections similar to the rank rails be installed adjacent to the ramp and extend in line with each of the rank rails (Figs. 2, 3).

*Jockey pulleys; structural details*

In order to give the desired lead to the various driving cables which are to be described below, I provide cable fair-leads at various points and I prefer to form them as jockey pulleys which are fixed to various track members and bolsters. The jockey pulleys are identified as 120–134, inclusive, and their relative locations are shown in Figs. 2 and 4. Certain of these pulleys are arranged in pairs, one pulley above the other on a common shaft and both pulleys of the pair preferably being of equal diameter; these pairs are indicated diagrammatically in Fig. 4 as two concentric circles, the smaller being the upper pulley and the larger the lower pulley. The function of each fair-lead pulley will be explained in connection with the descriptions below of the several driving cables.

Although in general I have not shown structural details of the framing and supports for the trackage system, Figs. 2, 11 and 12 show struts 140 which serve to increase the rigidity of the cross-over structure.

*Rank-drive modulator and collector*

To drive the platforms along the ranks I may employ any reciprocating mechanism having a stroke length of one platform space, but I prefer to use drive modulating and collector mechanism such as is disclosed in my aforesaid application Serial No. 29,913, the specific adaptation of which to the present circuit is shown generally in Figs. 1, 2 and 4 hereof and is detailed in Figs. 5, 6 and 7.

A rank-drive prime mover 200 (Fig. 4) is preferably located at one side of the circuit and comprises an electric motor or other power unit, a reduction gear, and a double-wrap horizontal winding drum to which drive cables 201 and 202 are fixed, and upon which they are both wound in the same direction, i. e., to take in one cable as the other is payed out. Alternatively, here and in other places throughout the circuit where I have shown two cables both fixed to and wrapped on a single drum, I may of course use a single cable having its midpoint fixed to the drum. As a yet further alternative, applicable only to the winding drum of prime mover 200 and to winding drum 303 of the traverse drive mechanism later to be described, either of these drums may take the form of a capstan on which a sufficient number of wraps of cable are taken without fixing the cable to the drum; it is possible to do this because limit switches are preferably used to control the sequence of operations as described below, and in such case some degree of slip of the cables on these capstans can be tolerated.

Cable 201 runs from prime mover 200, around north fixed horizontal drive sheave 203, then around north horizontal sheave 227 on the rank-drive modulator carriage 220, and back to a fixed anchorage at 201A. Cable 202 takes a similar course to the south, around south fixed horizontal drive sheave 204 and south horizontal sheave 227 on carriage 220, and back to a fixed anchorage at 202A. Since the carriage is free to reciprocate in a north-south direction, the rotation of prime mover 200 in either direction draws in one of the drive cables 201 and 202 and pays out the other, thus drawing carriage 220 in a corresponding direction.

Incidentally, I prefer that cable anchorages 201A and 202A, and certain of the other cable anchorages and terminals later mentioned, be adjustable, as by being mounted on bolts threaded to fixed brackets or the like, so that minor adjustments may be made in the tension or effective length of the several cables. For the sake of simplicity, however, the drawings show the cable anchorages as fixed, and some are shown only diagrammatically.

I prefer to locate the entire rank-drive modulator carriage and collector assembly 210 between and parallel with the two rank tracks (Fig. 2). Referring to Figs. 5, 6 and 7, the assembly lies generally within two north-south I-beam rails 211, which are spaced apart and fixed to the floor by cross ties 212. Fixed to rails 211 are mounting plates 213 that carry vertical stub shafts 214 on which horizontal drive sheaves 203 and 204 are journaled. In order that, in a two-rank four-stroke-cycle circuit, the collector coupler may engage the two parallel ranks alternately, the rank-drive collector must lie in the space between the ranks, but the rank-drive modulator carriage may be located elsewhere in any convenient location, and may operate the collector by remote actuating means. For example, the inter-rank collector may be slave-driven, as by means of cables or the like, from an auxiliary collector which is link-coupled to the remote modulator carriage and located adjacent to it.

The rank-drive modulator carriage 220 comprises a pair of side frame members 221 spaced apart by end cross plates 222 (lower) and 223 (upper) and center cross members 224. Adjustable threaded longitudinal stretchers 225 enable the length of the carriage to be varied within predetermined limits. At either end of the carriage, vertical stub shafts 226 mounted between the end plates carry north and south horizontal modulator sheaves 227, both sheaves having double grooves (Fig. 6). The carriage runs back and forth on wheels 228 located near each corner of the carriage and rolling on the inside lower flanges of rails 211; side thrust wheels 229 near each corner of the carriage bear against the vertical web of the same rails (Fig. 7).

A so-called metering cable 230, anchored at points 230A at both ends of the assembly 210, is wrapped once around the outer periphery of the pair of modulator sheaves 227, the course of the metering cable being best seen in Fig. 4.

A drive link or pitman 235 connects the rank-drive modulator carriage 220 and the collector 250. One end of the link is pivoted at 236 to a trunnion block 237 which is fixed to a point on the metering cable 230. The trunnion block is also disclosed in my aforesaid application Serial No. 29,913; it comprises a nose 238, which seats on the metering cable (Fig. 7), and tortuous internal passages through which the cable is threaded and by means of which it is fixed in place upon the cable. The other end of the link is pivoted at 239 to the underside of collector 250, and is separated from the latter by clearance washer 240.

As shown, metering cable 230 lies in the upper groove of modulator sheaves 227, and drive cables 201 and 202 lie in the lower grooves. As an alternative equivalent, the cables in the upper and lower grooves might be interchanged, which would entail placing link 235 underneath the carriage and require certain obvious changes in the construction of collector 250.

The rank-drive collector 250, which straddles modulator carriage 220, comprises a main cross-plate 251 at the north end, and other cross members 252, all formed into a rigid frame structure by means of side members 253. The collector reciprocates on wheels 254 near each of its corners, which run on the outside lower flanges of rails 211; side thrust wheels 255, also placed near the corners of the collector, bear against the upper flanges of the rails. Mounted on the end cross-plates of the collector are north and south cable terminals 256 and 257, to which are fixed the opposite ends of jacking drive cable 258 (Figs. 4, 5). The course of collector 250, as it reciprocates, is substantially parallel with the ranks.

Hook-shaped members 259 on the underside of center cross-plate 252 (Fig. 7) support link 235, especially while trunnion block 237 moves from one to the other of the modulator sheaves 227.

The trunnion block is fixed to metering cable 230 at such a point that, when modulator carriage 220 lies in its southern position, the block lies as shown in Fig. 5, with the center of its pivot 236 lying on a line perpendicular to rails 211 and passing through the center of the south modulator sheave 227. As the carriage is drawn north by winding in drive cable 201 (Figs. 4, 5), the trunnion block likewise moves north; it first skirts the south half of south modulator sheave 227 and describes in space one half of a substantially cycloidal curve, then moves north in a straight line until it arrives squarely opposite the center of the north modulator sheave, skirts the north half of that sheave and describes in space the second half of a substantially cycloidal curve, and finally comes to rest in the same position with respect to the north sheave as it occupies in Fig. 5 with respect to the south sheave. This motion is reversed during the southbound stroke of the modulator carriage.

A projection of the motion of the trunnion block, taken parallel with the rails 211, is imparted to the collector 250 by means of link 235; and this projected motion has the very desirable characteristics of negligible terminal acceleration and deceleration, and precise length of travel in spite of moderate over-run of the modulator carriage 220, all as more fully described in my aforesaid applications Serial Nos. 718,737 and 29,913. The parts of the modulator carriage link and collector are so proportioned that the collector travels between two fixed stations spaced apart in the north-south direction by a distance equal to one platform space. Since the collector is direct-connected to one rank or the other by means of the collector coupler next to be described, each stroke of the collector advances the driven rank of platforms by one platform space.

*Collector coupler*

I prefer to transfer the motion of rank-drive collector 250 to the ranks by means of the collector coupler 260, which is fixed upon main plate 251 of the collector (Figs. 4–8 incl.).

This coupler comprises vertical end plates 261 in which latch bar 262 may slide from side to side, the bar lying in the east-west direction and, in either of its extreme positions, drivably engaging a platform in one rank or the other. I have already explained how the bar may engage the platforms either by being inserted between the troughs of adjacent platforms, or by way of windows 14, or by means of any other equivalent jaw or engageable part on or of the platforms.

As will be understood from Figs. 7 and 16, the troughs 10 of my platforms extend sidewise beyond the platform wheels 26, and the latch bar is preferably engaged with the platforms at a point that lies outside the transverse wheel span. Hence I need cut no gaps in either the running rails or in the guide rails of the rank tracks in order to couple the platforms to the rank-drive mechanism.

The end plates 261 of the collector coupler are spaced apart by means of rod 263 and fixed arbor shaft 264, and on the latter the partly threaded hollow arbor 265 is journaled. Actuator drum 266 is rotatably mounted on the arbor, its left side being merely journaled on the smooth portion of arbor 265 (Fig. 7) and its right side being internally threaded and engaging the threads on the arbor. A compensator drum 267, of the same diameter as actuator drum 266, is keyed at 268 to the end of arbor 265, which is remote from the threads. The assembly of arbor, actuator drum, and fixed compensator drum resembles a bolt and nut, the arbor and the compensator drum comprising the bolt shank and head, and the actuator drum the nut.

Cables 269 and 270 are fastened to actuator drum 266 and are wrapped about it, both in the same direction. Cable 269 extends to the north and 270 to the south, the former being partly payed out and the latter fully wrapped, when rank-drive collector 250 is at the south end of its stroke (as in Figs. 5, 7 and 8). Cables 269 and 270 are part of the cross-carriage traverse drive cable system (see Fig. 4); hence whenever the cross-carriages are traversed, cables 269 and 270 are drawn in one direction or the other, and the actuator drum is correspondingly rotated.

Whenever relative rotation occurs between actuator drum 266 (the nut) and arbor 265 (the bolt), the drum will move axially along the arbor, the direction of axial movement depending on the direction of the relative rotation between the parts. The flanges 271 of the actuator drum embrace a roller 272 which is journalled on a stub shaft 273 fixed to the latch bar 262, and thus the axial movement of the actuator drum is imparted to the latch bar, to drive it from side to side.

It will be understood that latch bar 262 is to be shifted from one rank to the other only when both ranks are at rest, i. e., only when the cross-carriages are in motion. By driving the latch bar actuator drum 266 from cables 269 and 270, which are parts of the cross-carriage traverse drive system, appropriate phasing of this operation of the actuator drum is automatically obtained.

However, when the cross-carriages are at rest and the rank-drive collector is in motion, cables 269 and 270 are temporarily fixed in position. Hence as the collector moves and carries the actuator drum 266 with it along the length of cables 269 and 270, such relative motion between the cables and the collector also causes the actuator drum to rotate, but in the direction opposite from that in which the preceding movement of the cables rotated it. The result of thus rotating actuator drum 266 as collector 250 moves would be to withdraw the latch bar from the rank which it is driving, and cause it to attempt to engage and drive the stationary rank, which at that time is full of platforms and must remain at rest. Such an effect is what I means by calling this type of collector coupler "collector-influenced." Such a result, however, must not occur, and I therefore compensate the actuator drum 266 so that the latch bar becomes independent of collector motion or position.

To effect the necessary compensation, cables 274 and 275 are both wrapped around compensator drum 267 in the same direction, one end of each cable being fastened to the drum and the far ends of the cable being anchored at points 274A and 275A at opposite ends of the assembly 210. The compensating cables are wrapped on drum 267 in the same direction as cables 269 and 270 on drum 266; and north compensating cable 274 is almost wholly payed out, and south cable 275 fully wrapped, when the collector 250 is at the south end of its stroke (as in Figs. 5, 7 and 8).

Being thus permanently fixed in position, compensator cables 274 and 275 have no effect on compensator drum 267 when collector 250 is at rest; these cables only rotate the compensator drum when the collector is in motion, i. e., when the actuator drum 266 is also rotated by way of the then temporarily fixed cables 269 and 270. Thus as the collector moves in its north-south path, the compensator drum and the threaded arbor 265 (the bolt head and the shank) and the actuator drum (the nut) rotate in proportion to the motion of the collector, all in the same direction and at the same speed. Rotation of the compensator drum in a given direction tends to drive the actuator drum in the direction opposite to that in which the latter tends to be driven by its own rotation in the same direction. Hence when both drums are rotated in the same direction at the same speed, their separate effects neutralize each other, or to put it another way, there is no relative motion between the actuator drum and the arbor, and hence no movement of the actuator drum occurs along the arbor. Consequently the latch bar remains undisturbed as the collector moves, and the position of the bar becomes independent of the collector's position or motion.

While I have shown actuator drum 266 as the one capable of axial movement along arbor 265 and compensator drum 267 as the one keyed to the arbor, it will be understood that, as an alternative equivalent, the drives for the two drums may be interchanged so that the fixed drum is driven from the cross-carriage drive cables 269 and 270 and the free drum driven from cables 274 and 275, the wrapping of the cables on both drums then being reversed from the directions shown in Figs. 7 and 8.

As a further alternative, I may combine latch bar 262 and arbor 265 into a single member, the arbor itself becoming the latch bar. For example, the arbor may be mounted so that it is fixed against rotation by actuator drum 266 but is free to move axially. Actuator drum 266 may then be left free to rotate on the arbor but will be restrained against axial movement. The compensator drum 267 may remain keyed to the arbor so that drum and arbor rotate together, but this drum will preferably be so arranged that it too is fixed against axial movement, while permitting the arbor to move sidewise with respect to the drum. In this modification, also, the actuator and compensator cables may be interchanged on the two drums, as already described.

It will be appreciated that the preferred collector coupler which I have described comprises a rolling connection from an alternately movable and fixed drive member (cables 269 and 270) to an actuator element (drum 266) mounted on the collector 250, and that the compensating means comprises a similar rolling connection from a permanently fixed drive member (cables 274 and 275) to a compensating element (drum 267) also mounted on the collector. The alternative structures above described also comprise similar rolling connections. Other equivalent means than cables may, of course, be employed to drive the two drums through rolling connections. For example, a longitudinal rack may take the place of either pair of cables and may mesh with a pinion drivably associated with or taking the place of the corresponding drum, the rack for the compensator drum being fixed in place, and that for the actuator drum being reciprocated lengthwise by or in synchronism with the cross-carriage traverse drive and at other times being temporarily fixed in position.

I may also compensate the actuator drum 266 in other equivalent ways, as, for example, by means of an electric motor mounted on the collector and so arranged and so controlled, as by way of limit switches or other known electrical control devices, that whenever the collector is in motion, the motor rotates the compensator drum (or the arbor directly) in the same direction and with the same speed as the actuator drum.

I have mentioned that it is possible to actuate the collector coupler latch bar by means which are inherently independent of the motion or position of the collector. Such an actuator does not require any compensation against collector movement, and may, for example, consist of a flexible mechanical drive of the core-and-reaction-sheath type operated from a fixed prime mover and direct-connected to the latch bar, or a flexible hydraulic drive terminating on the collector at the latch bar and operated from a fixed source of fluid pressure, or an electric motor mounted upon the collector and connected to a source of power either by means of a flexible cable or trolley contacts. Each such actuator would, of course, be so phased as to operate only when the collector is at rest, i. e., only when the cross-carriage traverse drive is in operation, and might be operated or controlled from the traverse drive.

In any of the above-described forms of collector coupler, the means by which the energy to drive the latch bar is brought to it, whether such means take the form of the cables that drive actuator drum 266, or the wires energizing a coupler actuator that includes an electric motor mounted on collector 250, or a flexible core-and-reaction-sheath or hydraulic drive, or other equivalent means, may be regarded as conduits transmitting energy to the coupler from an energy source external to the collector.

While I prefer to employ the 4-stage circulation cycle for which the specific storage circuit of the drawings is designed, it is possible to utilize my new collector coupler in a circuit designed for 2-stage circulation, in which two platform spaces at diagonally opposite corners of the circuit are left vacant, instead of there being only one empty platform space. By use of the 2-stage circulation cycle, it becomes possible to move both ranks of the platforms simultaneously in opposite directions and to effect simultaneous traverse of the platforms in opposite directions in the cross-overs, thus reducing the circulation cycle to two stages and doubling the effective speed at which the platforms circulate.

If two-stage circulation is to be employed, two collectors will be required, one for each rank, with a collector coupler mounted on each. The two collectors must reciprocate simultaneously in opposite directions and may be interconnected, as by cables, so that they can be driven by means of a single mechanism such as the reciprocating modulator carriage 220. Preferably the two collectors would both be located between the rank tracks, in which event the collector coupler on one collector may be arranged to drive one of the ranks on one stroke of the collector and to drive the other rank on the return stroke, and vice versa for the other coupler. Alternatively, the individual collectors may be located each outside of or on the same side of its own rank, and in that event the cycle will be modified so as to include an extra return stroke of the collectors, disengaged from the platforms, during the cross-over traverse.

*Cross-carriage traverse drive*

In order to draw the cross-carriages 400 from one rank to the other, I employ reciprocating traverse drive mechanism connected with the carriages by cables arranged in such manner that the carriages in both cross-overs are traversed simultaneously and in the same direction.

While any reciprocating mechanism having a stroke equal to the required travel of the cross-carriages may be used, I prefer drive modulating and collector mechanism similar to that used for the rank drive, the specific adaptation of which for the traverse drive is shown generally in Figs. 1, 2 and 4 and in detail in Figs. 9 and 10.

The preferred traverse drive mechanism includes a prime mover 300 which is mounted at one side of the circuit, and which comprises an electric motor or other power unit, a reduction gear, and a double-wrap horizontal winding drum 303 (Fig. 4) to which drive cables 301 and 302 are fixed and on which they are both wound in the same direction. As is most clearly shown in Fig. 4, cable 301 runs south from drum 303, around north horizontal sheave 325 on the traverse modulator carriage 320, then back to an anchorage at 301A. Cable 302 comes from the opposite side of winding drum 303, runs south and around south horizontal drive sheave 304, then back around south horizontal sheave 325 on the traverse modulator carriage, and finally runs south again to an anchorage at 302A.

Carriage 320 is free to reciprocate in the north-south direction; hence as prime mover 300 rotates drum 303 in either direction, it draws in one of the drive cables 301 and 302 and pays out the other, thus pulling carriage 320 in a corresponding direction.

The entire traverse drive modulator carriage and collector assembly 310 may be located in any convenient place; I prefer to place it midway between the cross-overs and just to the west of the west rank, arranged lengthwise of the ranks (Figs. 1, 2). Referring to Figs. 9 and 10, the assembly lies generally between longitudinal north-south channel-section rails 311 which are spaced apart and fixed to the floor by brackets 312 and end frame members 313. Fixed to south end member 313 are mounting plates 314 that carry a vertical stub shaft 315 on which horizontal south drive sheave 304 is journaled. Winding drum 303, which forms part of power unit 300, is journaled on north vertical shaft 315. The power unit lies at the north end of the assembly 310, but only a portion of it is shown in Fig. 9 (part of a reduction gear, and the winding drum 303).

The traverse drive modulator carriage 320, drive link 335, trunnion block 337 and collector 350 are constructed and operate very similarly to the corresponding rank-drive elements and hence need no detailed description of structure or operation, other than to point out the several parts. Modulator carriage 320 comprises a pair of side frame members 321, end frame members 322 (lower) and 323 (upper), adjustable stretcher 324, a pair of spaced double-groove horizontal modulator sheaves 325 journaled on vertical stub shafts 326, and running wheels 327 carried on brackets 328 at each corner of the carriage, the wheels running on the lower flanges of the in-turned channel-section side frame members 351 of collector 350 (Fig. 10).

The traverse drive mechanism being lighter than that for the rank-drive, I find no need for side-thrust wheels on the traverse modulator carrige or collector; but wherever operating conditions require, thrust wheels may be incorporated into the structures.

A metering cable 329, anchored at points 329A at both ends of the modulator-collector assembly 310, is wrapped once around the outer periphery of the modulator sheaves 325, the course of cable 329 being best seen in Fig. 4. In Fig. 9 only the south anchor 329A on cross member 313 is shown, the other being in a corresponding position at the north end, beyond view.

One end of link 335 is pivoted at 336 to trunnion block 337, the nose 338 of the block riding on and being fixed to cable 329. The other end of the link is pivoted to the under side of collector 350 at 339, and 340 is a clearance washer.

Traverse drive collector 350 straddles and carries the modulator carriage 320. The collector comprises (Figs. 9, 10) a pair of side frame members 351, a pair of end plates 352, and a center plate 353. It reciprocates on wheels 354 at each corner, which run on the lower flanges of in-turned fixed channel-section rails 311 (Fig. 10). The collector carries two cable terminals 355 and 356, to which the respective cross-carriage traverse drive cables 357 and 358 are fixed (Fig. 4), the cable terminals preferably being at opposite ends of the collector.

As modulator carriage 320 moves the length of its stroke, trunnion block 337 describes in space the same type of extended cycloid curve as block 237 in the rank-drive mechanism; the north-south projection of the motion of the block is imparted to the traverse drive collector 350 through link 335, and has the same characteristics of negligible terminal acceleration and deceleration and precise stroke length as in the case of the rank-drive. The parts are so proportioned that collector 350 travels between two fixed stations spaced apart by a distance equal to the required traverse of the cross-carriages in the cross-overs. The collector is direct-connected to the cross-carriages by cables 357, 269, 270 and 358 (Fig. 4), whence it will be clear that each stroke of the collector traverses both cross-carriages through the cross-overs.

*Cross-carriages*

The cross-carriages, one in each cross-over of the circuit, are indicated generally by 400 (Figs. 1, 4, 11 and 12). Fig. 4 shows the two cross-carriages diagrammatically, each lying in the west rank, and Figs. 11 and 12 show the north cross-carriage in the west rank. Since both carriages and both cross-overs are alike, it will suffice to describe one.

As best shown in Figs. 11 and 12, each cross-carriage comprises a relatively rigid rectangular frame comprising a pair of north-south side members 401 formed of inwardly facing channel sections, two east-west channel section cross members 402, one at either end, and one angle section cross member 402A in the middle of the frame. Cross members 402 and 402A extend beyond the side members 401, which are spaced apart by approximately the gauge of the rank tracks. At the corners of the cross-carriage frame are braces 403. The length of the cross-carriage is slightly less than the space between the two bridges 20 of each platform, and its height, with jacks down, is slightly less than the elevation of the underside of the platform troughs 10, so that the carriage may run in under or out from beneath a platform standing on either rank track in the cross-over.

As best seen in Figs. 18 and 19, each carriage 400 rolls along cross tracks 102 or 103 upon preferably unflanged running wheels 404, which are journaled on horizontal axles mounted in vertical cheek pieces 407 that are attached to the respective end frame members 402. Journaled on vertical shafts carried by the same frame members and cheek pieces are upper and lower side thrust wheels 405 and 406, each upper thrust wheel being slightly offset from its companion lower wheel, as shown in Figs. 11 and 12.

Upper thrust wheels 405 contact the vertical wall 22 of the adjacent platform bridge 20 when the cross-carriage lies beneath a platform. These wheels thus prevent the platform from falling off the cross-carriage in the north-south direction while the platform is traversing the cross-over. Further, since both cross-carriages lie in the stationary rank of platforms while the other rank is in motion, wheels 405 also block the stationary rank against movement while the other rank advances.

Lower thrust wheels 406 bear against the lateral guide rails 104 of the cross-over tracks 102 and 103, and serve to keep the cross-carriages properly aligned.

From Figs. 4, 11 and 12 it will be clear how the traverse drive cables 357, 269, 270 and 358 are attached to and drive the two cross-carriages. Cable 357 starts at its terminal 355 on the traverse drive collector 350, runs thence north and around jockey pulley 120, east and around pulley 121, and west to a terminal 357A on the west end of central cross frame member 402A of the north cross carriage 400. Cable 269 starts from a similar terminal 269A on the east end of the same member 402A, runs thence west and around pulley 126, southeast and around the upper pulley of the pair designated as 125, and finally south to the latch bar actuator drum 266. Cable 270 runs south from the same drum, around the upper pulley 127, southeast and around pulley 128, and thence west to a cable terminal 270A on the west end of the central frame member 402A of the south cross-carriage 400 (similar to terminal 357A in Figs. 11, 12). Cable 358 begins at terminal 358A at the east end of the same member 402A of the south carriage, runs west and around pulley 124, thence east and around pulley 123, west and around pulley 122, and finally north to the traverse collector 350 at terminal 356.

It will thus be apparent how the north and south travel of traverse drive collector 350 causes the cross-carriages to move through the cross-overs simultaneously, and in the same direction, cables 269 and 358 being the ones which draw the carriages west-bound, and cables 357 and 270 east-bound. It will also be clear how I utilize the operation of the traverse drive cables to drive the latch bar actuator drum 266 by means of cables 269 and 270.

It will be noted that cables 357 and 358 are drivably connected directly between traverse drive collector 350 and the respective north and south cross-carriages 400. Cables 269 and 270, which drive their respective cross-carriages in the directions opposite to the drive of cables 357 and 358, are each drivably connected back to collector 350 by way of the other of the same pair (i. e., cable 270 or 269), plus one of the cross-carriages and one of the two cables 357 and 358. For example, cable 269 is drivably connected back to collector 350 by way of cable 270, south cross-carriage 400 and cable 358. It will be seen, however, that each cross-carriage is in effect driven by only two cables, both of which lead back to the traverse drive collector 350, one cable being effective to draw the carriage in one direction and the other to draw it in the opposite direction.

It will be noted that the two jockey pulleys in the middle of each cross-over, i. e., 121 and 126 in the north cross-over and 124 and 128 in the south, lie in the space between the rank tracks, the two pulleys of each pair being on opposite sides of this space. In the preferred arrangement, the cable attached to the east side of a cross-carriage passes around the western pulley of the pair in the cross-over, and the cable attached to the west side of the carriage passes around the eastern pulley of the same pair. In other words, each of the two carriage drive cables is attached at what becomes the trailing edge of the carriage when that cable is the one in tension (i. e., the one driving the carriage). The initial lead of each such cable is away from the carriage side at which the terminal of that cable is located, and toward the inner side of that cable's first jockey pulley. Furthermore, as each cross-carriage drive cable leaves its first jockey pulley (for example, as cable 269 leaves pulley 126, or cable 357 leaves pulley 121), the cable dips downward slightly and passes under the intervening rank and cross-over tracks on its way out of the cross-over.

By utilizing such a pattern of cross-carriage drive cabling, all parts of such cables which lie above the trackage system are drawn out of the rank which the carriage is vacating or has last vacated, and are brought to lie in the rank which the carriage is entering or occupies. The former is the rank in which the platforms will next be in motion, and their way is thus kept clear of traverse drive cables; the latter is to be the stationary rank and is free to accommodate the cables. In Figs. 1 and 4, for example, if the cross-carriages have just completed a traverse into the west rank, they will remain there while the next step, the advance of the east rank northward, is effected. It will be observed in Fig. 4 that all parts of cables 357, 269, 270 and 358 which lie above the tracks (i. e., the parts extending from the cable terminals on the cross-carriages to the first jockey pulleys 121, 126, 124 and 128) lie to the west of the east rank track 100, which is thus clear for the northward movement of the platforms.

*Cross-carriage jacks*

My present storage circuit is distinguished in a further respect from all others of which I am aware, in the construction of the cross-carriage mounted lifts or jacks that I prefer to use in a circuit of this type in order to raise the platform in the cross-over off the rank track so that it may cross to another rank.

Referring to Figs. 11, 12 and 15, the jacks on each cross-carriage 400 are actuated from a central transverse threaded drive shaft 410, which is carried in bearings 411 and has a left-hand thread ("LH") at one section and a right-hand thread ("RH") at another. At each end of the jack drive shaft is a clutch socket 412 having flared jaws 413 and an intervening slot (Fig. 15). On each threaded section of the shaft is a threaded traveler block 414 to which are pivoted top and bottom pairs of toggle links 415 (Figs. 11, 13), the outer ends of the links being pivoted upon thrust blocks 416 that are slidably mounted on central transverse synchronizing shafts 417. Coil springs 418 on the end sections of shafts 417, between blocks 416 and fixed collars 419, absorb any excess contraction of the toggles.

Wheels 420 are journaled at the ends of synchronizing shafts 417 and run on the lower flanges of side members 401. Pivoted at each end of each of the two synchronizing shafts 417 is a thrust bar 421 which lies parallel with and adjacent to a section of the side frame member 401. At their far ends, i. e., at the north and south ends of the cross-carriage, thrust bars 421 are fixed to intermediate transverse synchronizing rods 422, on the ends of which other wheels 423 are journaled. Wheels 423, like wheels 420, also run on the side frame members 401. At the far tip of each of the four thrust bars 421, a jack link 425 is pivoted, at 426, and the pair of such links at each end of the carriage is fixed to an end transverse synchronizing shaft 427. As best shown in Fig. 18, at each corner of the carriage one end of a jack shoe 428 is journaled at 429 to a fixed pivot upon the side frame 401 and its other end is journaled on an end of synchronizing shaft 427. An ear 430 of the link extends beyond shaft 427.

It will be clear that, as the jack drive shaft 410 is rotated in the direction which expands the toggle links 415 (the position shown in Figs. 11, 13 and 18), all four thrust rods 421 move outward from the center of the cross-carriage and erect jack links 425, and hence raise jack shoes 428. As will be seen from Figs. 16 and 18, which show a cross-carriage in position beneath and supporting a platform, the jack shoes are located directly beneath portions of troughs 10 of the platform and, when the shoes are raised, the platform is lifted free of the rank track, as indicated by the position of wheels 26 in these figures, and is then ready to be transported through the cross-over while resting on the cross-carriage.

I prefer to proportion the toggles and the jack links so that the lifting action is completed as they all come to dead center; this, together with a suitably low pitch to the threads on drive shafts 410, assures that the jacks will not creep under load.

At the same time that the platform is being loaded upon the cross-carriage, the ears 430 of the jack links 425 rise alongside and extend above the jack shoes 428, as shown in Figs. 13, 16 and 18. The ears 430 rise alongside the inner sides 12 of the platform troughs and thus act as guards to prevent the platform from falling sidewise from the jack shoes while the latter are in raised position. I may also arrange that, when the jacks are raised, a portion of the jack links 425 or of jack shoes 428 will rise against transverse parts of the platform, for example against vertical walls 22 of the platform bridges 20, and serve instead of or in addition to side thrust wheels 405 of the cross-carriage, to prevent the platform from falling off the jacks in the north-south direction and to block the platforms in the stationary rank.

As the jack drive shaft 410 is rotated in the reverse direction, the toggle links will be contracted (the position shown in Figs. 12 and 14). The thrust bars 421 then are drawn toward the center of the carriage, thus lowering jack links 425 and jack shoes 428 and clearing ears 430 from the way of the platform troughs. This action unloads the cross-carriage by lowering the platform to the rank track, where it is ready to be drawn from the cross-over when the rank next moves, as indicated in Fig. 17, which shows the jacks collapsed.

Although it would be possible to use independently operable jacks upon the cross-carriages, or to use inter-connected hydraulic jacks, I prefer the inter-connected mechanical jacks which I have described, since they afford synchronized operation in spite of an unbalanced load on the platform (which places a greater share of the load on some of the jacks than on the others).

I prefer to operate the jack drive shafts 410 of the cross-carriages by means of jacking drums 440, one located at either side of each cross-over and in line with its associated jack drive shaft, as seen in Figs. 2, 11 and 15. Each drum 440 lies slightly off the outer edge of the rank, and is fixed on shaft 441 which is journaled in bearing 442 carried by bracket 443. Each shaft 441 terminates at its inner end in a clutch member taking the form of a jacking nose 444 which carries transverse pins 445. The groups of pins on both jacking drums in each cross-over are angularly aligned with one another and with the socket clutch members 412 on the ends of the associated jack shaft, so that as either socket is presented to its associated jacking nose, the nose enters the socket and the pins fit the slots between socket jaws 413. Thus as the winding drum is rotated while its nose is engaged with the jack drive shaft, the shaft turns and the jacks are operated in the manner already described. As shown in Fig. 15, each winding drum 440 is preferably mounted on a conical stub end of its shaft 441, which facilitates backing the drum off to adjust the angular orientation of its pins 445.

I may drive the jacking drums 440 in any desired manner which will operate the proper drum in the proper direction at the correct phase of the circulation cycle which is employed. In the 4-stage cycle which I prefer, the jack drive shafts are preferably operated each time either rank advances, and the jacks in each cross-over operate reversely, i. e., the north jacks are raised as the south are lowered, and vice versa. This may be accomplished by properly phased individual electric motor drives, as for example by interconnected servomotors of the type that maintain accurate angular synchronism among the several units, or it may be done in other known ways.

I prefer, however, to simplify the control and phasing problem by operating the jacking drums by means of a cable wrapped around each of the drums in series and connected to the rank-drive collector 250, so that all the drums are automatically rotated in correct phase and direction whenever the rank drive mechanism operates. For this purpose, jacking drive cable 258 (Fig. 4) comprises five sections in series, which are wrapped around and fastened to the respective winding drums. The first section of cable 258 starts at terminal 256 on the rank-drive collector 250 and runs thence north and around lower jocket pulley 125, west and around lower pulley 129, and under northwest jacking drum 440. A second section of cable 258 starts on the same drum, and from its upper surface leads south and around upper pulley 129, thence east and around lower pulley 130, and under the northeast jacking drum 440. A third section of cable 258 is fastened to the same drum, and leads south from its upper surface and around upper pulley 130, thence west and around pulley 131, then south almost the length of the circuit and around pulley 132, then east and around upper pulley 133, and finally south again and over the southeast jacking drum 440. A fourth section of cable 258 starts on the same drum, leads north from its under side and around lower pulley 133, then west and around upper pulley 134, and finally south and over the southwest jacking drum. The fifth and final section of cable 258 starts on the same drum and leads north from under the drum and around lower pulley 134, thence east and around lower pulley 127, and finally north to cable terminal 257 on collector 250.

It will thus be seen that when collector 250 travels in either direction, all the jacking drums rotate in unison and in the same direction. Since, as indicated in Fig. 4, the left-hand and right-hand threaded sections of the jack drive shafts 410 are reversed on the two cross-carriages 400, the jacks on the two carriages are reversely operated, as is required for 4-stage circulation. The same result would of course also follow if I were to install both jack drive shafts so that their threadings were parallel, and if I were then to reverse the jacking drum cable drives to one of the cross-overs.

It will be appreciated that jacking drive cable 258 has a rolling connection with each of the jacking drums 440, and thus it will be clear that I may substitute, for the cable, other equivalent means having a similar rolling contact with the shaft 441 of jacking nose 444, such as, for example, a rack and pinion drive of the type already mentioned above in connection with the collector coupler.

*Cycle of operation*

Having described the construction of a preferred embodiment of my invention, I shall now outline its operation through a complete cycle of operation which advances all the platforms by one position. Attention is directed especially to Figs. 1 and 4, which show a 4-stage-cycle circuit in its normal starting position, i. e., a vacant space in the northeast corner, rank-drive collector 250 in its south position, latch bar 262 engaged with a platform in the east rank, traverse drive collector 350 in its north position and both cross-carriages in the west rank, the jacks raised on the north cross-carriage so that platform 4 is lifted free of the rank track and loaded upon the north carriage, and the jacks lowered on the south cross-carriage so that platform 1 rests on its rank track and the south carriage is unloaded. Fig. 4 also indicates by arrows the directions in which various cables, drums and other parts move or rotate at one stage in the circulation cycle. Assuming counter-clockwise circulation of the platforms, the following are the several steps by which the cycle is accomplished:

*Stage* 1.—East rank moves north:

1. Prime mover 200 rotates clockwise, drawing in drive cable 201 and paying out cable 202.

2. Rank-drive modulator carriage 220 is drawn north by cable 201, which pulls north modulator sheave 227 toward north drive sheave 203.

3. Rank-drive collector 250 and latch bar 262 likewise move north, driven by carriage 220. Both actuator and compensator drums 266 and 267 are rotated at the same speed and in the same direction by virtue of the motion of the collector acting upon the fixed cables 269—270 and 274—275; hence latch bar 262 is unaffected and remains engaged with the east rank, which moves one platform space to the north. The empty northeast corner becomes occupied by platform 5, and the southeast corner becomes vacant.

4. Collector 250, acting meanwhile on jacking drive cable 258 at terminal 257, draws the various sections of the cable in the directions of the arrows placed on them (Fig. 4), and causes all four jacking drums 440 to rotate clockwise (curved arrows).

5. The cross-carriage jacks are transposed; i. e., those in the north cross-over are lowered (thus unloading the north cross-carriage and dropping platform 4 to its rank track), and those in the south are raised (thus loading platform 1 upon the south cross-carriage and lifting it from its rank track).

*Stage* 2.—Cross-carriages move east:

6. Prime mover 300 causes drum 303 to rotate clockwise, drawing in drive cable 302 and paying out cable 301.

7. Traverse drive modulator carriage 320 is drawn south by cable 302, which pulls south modulator sheave 325 toward south drive sheave 304.

8. Traverse collector 350 likewise moves south, driven by carriage 320. This draws traverse drive cable 357 in the directions of the arrows placed on it, thus pulling north cross-carriage 400 into the east rank while unloaded.

9. This action draws cable 269 in the arrowed direction, which in turn pulls cable 270 in the direction of its arrows, and thus moves the south cross-carriage also into the east rank, laden with platform 1. The vacancy has thus moved from the southeast to the southwest corner.

10. The traverse of the south cross-carriage to the east takes up cable 358 as collector 350 moves to the south.

11. Rank-drive collector 250 being now at rest, as cables 269—270 move in the arrowed directions they rotate actuator drum 266, but fixed cables 274—275 have no effect upon compensator drum 267. Hence latch bar 262 is shifted from the east rank and engages the west rank.

*Stage* 3.—West rank moves south:

12. Prime mover 200 rotates counter-clockwise, drawing in drive cable 202 and paying out cable 201 (reverse of step 1).

13. Rank-drive modulator carriage 220 is drawn south by cable 202 (reverse of step 2).

14. Rank-drive collector and latch bar 262 likewise move south, driven by carriage 220. Both actuator and compensator drums 266 and 267 again rotate together and leave the latch bar unaffected, whence it remains engaged with the west rank, which moves one platform space to the south. The empty southwest corner thus becomes occupied by platform 2, and the vacancy shifts to the northwest corner.

15. Collector 250, acting meanwhile on jacking drive cable 258 at terminal 256, draws the various sections of the cable in the directions opposite to the arrows, and causes all four jacking drums 440 to rotate counter-clockwise (reverse of step 4).

16. The cross-carriage jacks are transposed, oppositely to the transposition at step 5; i. e., the jacks in the north cross-over are raised (thus loading platform 5 in the northeast corner upon the north cross-carriage, and lifting this platform from its rank track), and lowering the jacks in the south cross-over (thus unloading platform 1 in the southeast corner from the south cross-carriage, and lowering that platform to its rank track).

*Stage* 4.—Cross-carriages move west:

17. Prime mover 300 causes drum 303 to rotate counter-clockwise, drawing in drive cable 301 and paying out cable 302 (reverse of step 6).

18. Traverse drive modulator carriage 320 is drawn north by cable 301 (reverse of step 7).

19. Traverse collector 350 likewise moves north, drawing cables 358, 270 and 269 in the directions opposite to the arrows, thus drawing both cross-carriages from the east rank to the west, the north carriage laden with platform 5, the south carriage unloaded. The vacancy has now moved from the northwest to the northeast corner, where it was originally located.

20. The traverse of the north cross-carriage to the west takes up cable 357 as collector 350 moves to the north (reverse of step 10).

21. Latch bar 262 is shifted from the west rank to the east (reverse of step 11).

In order to energize the motors of power units 200 and 300 in proper sequence and for appropriate intervals, I provide limit switches at both ends of the paths of the rank-drive and traverse drive modulator carriages 220 and 320, and connect them to relays arranged in an electrical control system such that each limit switch not only ends the stroke of its associated modulator but also initiates the succeeding stroke of the other modulator. A selector switch permits the cycle to be initiated and maintained in clockwise or counter-clockwise direction, by selecting which of the two prime movers is to open the cycle and in which direction it shall rotate during the first stage. No elaborate electrical control system is therefore required.

From the above description of a circulation cycle, it will be seen that when a two-rank circuit embodying my invention is operated in a 4-stage circulation cycle, the following relationships, in addition to those already pointed out elsewhere above, exist between certain of the circuit elements:

(*a*) As a platform moves along either rank track into or out of either cross-over, the corresponding cross-carriage lies at the opposite side of the cross-over, in the stationary rank. For example, if east-rank platform 5 in Fig. 4 moves into the north cross-over, during this operation the north cross-carriage lies in the west rank.

(*b*) The cross-carriages at both ends of the circuit traverse their respective cross-overs simultaneously and in the same direction, but only while both ranks are stationary.

(*c*) The loading and the unloading of the cross-carriages takes place as the carriages lie in the stationary rank and while the other rank is in motion.

Although I have described the construction and operation of a circuit which handles platforms each accommodating a single vehicle, it will be clear that by effecting suitable modifications in the structure and cabling of the circuit, it may be arranged to accommodate the sets of synchronized sub-platforms which have already been described.

The phraseology which I have employed above has been by way of description only and is not to be understood as words of limitation. I have no intention, by the use of such phraseology, to exclude any equivalents of the features shown and described, but recognize that various modifications of them are possible within the scope of my invention. For example, in using the word "cable" to describe the flexible means which actuate many of the elements of my storage apparatus, I intend to include all such equivalents as rope, wire rope, chain, and in fact any flexible means capable of transmitting energy only in tension.

I claim:

1. In storage apparatus, the combination of a load-carrying platform adapted to move along a first predetermined path, a cross-carriage adapted to move along a second predetermined path and to carry said platform along said second path, a collector adapted to drive said platform along said first path and being itself reciprocable on a course substantially parallel with said first path, means for reciprocating said collector, a collector coupler mounted and fixed upon said collector, and means including actuator means connected with and adapted to operate said coupler to drive said cross-carriage along said second path, said coupler being selectively engageable with and disengageable from said platform by said actuator means as said cross-carriage moves along said second path.

2. In storage apparatus, the combination of a pair of substantially parallel ranks of platforms adapted to advance in opposite directions in said ranks, a cross-carriage adapted to move, and to carry at least one of said platforms at a time, from one of said ranks to the other, a collector disposed between said ranks and adapted to drive said platforms along said ranks and being itself reciprocable on a course substantially parallel with said ranks, means for reciprocating said collector, a collector coupler mounted and fixed upon said collector, and means including actuator means connected with and adapted to operate said coupler to drive said cross-carriage from one of said ranks to the other, said coupler being engageable, by said actuator means as said cross-carriage moves from rank to rank, alternately with a platform in one of said ranks and then with a platform in the other of said ranks.

3. In storage apparatus including a load-carrying platform adapted to move along a first predetermined path, a cross-carriage adapted to move said platform along a second predetermined path, and means for driving said cross-carriage along said second path, the combination of a collector reciprocable on a course substantially parallel with said first path, means for reciprocating said collector, and a collector coupler mounted upon said collector and selectively engageable with and disengageable from said platform by actuator means drivable by a portion of said cross-carriage drive means, said actuator means including first and second coupler actuating members so constructed and arranged that as said collector moves along said first path both of said members are operable and the effects imparted by each of them to said coupler are substantially equal and opposite, whereby said coupler is inoperative during movement of said collector.

4. A combination in accordance with claim 1, in which said collector coupler comprises an axially reciprocable latch bar lying transverse to the course of said collector, said coupler actuator means being adapted to shift said bar axially in either direction.

5. A combination in accordance with claim 1, in which said cross-carriage drive means is adapted to reciprocate said carriage along said second path, being operable only when said collector is at rest and stationary when said collector is in motion, and in which said collector coupler comprises an axially reciprocable latch bar lying transverse to the course of said collector, said coupler actuator means being adapted to reciprocate said bar transversely of said collector and comprising (*a*) a rotatable actuator member adapted to impart, by its rotation in a given direction, a translational motion to said latch bar in a corresponding direction transversely of said collector, (*b*) a reciprocable member having a rotative connection with said actuator member and being connected externally of said collector to said cross-carriage drive means, said actuator member being rotatable by said reciprocable member through said rotative connection, (*c*) rotatable compensating means also mounted on said collector and adapted to impart, by its rotation in the same direction as said actuator member, a translational motion to said latch bar in a direction opposite to that imparted to it by said rotation of said actuator member, and (*d*) an anchored member having a rotative connection with said compensating means, said means being rotatable by said anchored member through its said rotative connection only when said collector is in motion, the drive diameters of said actuator member and of said compensating means being substantially equal, whereby when said collector is in motion the separate influences of said actuator member and of said compensating means upon said latch bar neutralize one another and said bar remains stationary with respect to said collector.

6. In storage apparatus including a load-carrying platform adapted to move along a plurality of ranks and to be traversed from one rank to another, and a cross-carriage likewise adapted to be traversed from one rank to another, the combination of a collector reciprocable on a course substantially parallel with one of said ranks, a first reciprocable drive mechanism for reciprocating said collector at spaced intervals of time, a second reciprocable drive mechanism for effecting said carriage traverse at other spaced intervals of time, and a collector coupler mounted upon said collector and selectively engageable with and disengageable from said platform, said coupler comprising (*a*) an axially reciprocable latch bar lying transverse to one of said ranks, (*b*) a rotatable actuator member adapted to impart, by its rotation in a given direction, a translational motion to said latch bar in a corresponding direction transversely of said collector, (*c*) a reciprocable member having a rotative connection with said actuator member and being connected externally of said collector to said second reciprocable drive mechanism, said actuator member being rotatable by said reciprocable member through said rotative connection, (*d*) rotatable compensating means also mounted on said collector and adapted to impart, by its rotation in the same direction as said actuator member, a translational motion to said latch bar in a direction opposite to that imparted to it by said rotation of said actuator member, and (*e*) an anchored member having a rotative connection with said compensating means, said means being rotatable by said anchored member through its said rotative connection only when said collector is in motion, the drive diameters of said actuator member and of said compensating means being substantially equal, whereby when said collector is in motion the separate influences of said actuator member and of said compensating means upon said latch bar neutralize one another and said bar remains stationary with respect to said collector.

7. A combination in accordance with claim 1, in which said cross-carriage drive means is adapted to reciprocate said carriage along said second path, being operable only when said collector is at rest and stationary when said collector is in motion, and in which said collector coupler comprises an axially reciprocable latch bar lying transverse to the course of said collector, said coupler actuator means being adapted to reciprocate said bar transversely of said collector and comprising (*a*) a rotatable arbor fixed in place upon said collector, (*b*) a rotatable actuator drum threadably mounted on said arbor, said actuator drum being adapted to impart, by its rotation in a given direction, a translational motion to said latch bar in a corresponding direction transversely of said collector, (*c*) a reciprocable cable haivng a portion wrapped around said actuator drum and other portions extending away from said drum in opposite directions parallel with the course of said collector, said extending portions being connected externally of said collector to said cross-carriage drive means, (*d*) a rotatable compensator drum of substantially the same diameter as said actuator drum and fixed upon said arbor, (*e*) a stationary cable having a portion wrapped around said compensator drum and other portions extending away from it in opposite directions parallel with the course of said collector, the opposite ends of said stationary cable being fixed in position beyond the limits of the reciprocation of said collector.

8. In storage apparatus, the combination of a wheeled load-carrying platform adapted to roll along a plurality of predetermined paths and to be traversed from one path to another, a cross-carriage adapted to be traversed from one path to another and to carry said platform while being so traversed, a reciprocable drive mechanism for said platform, said mechanism including a coupler selectively engageable with and disengageable from said platform, a reciprocable drive mechanism for said carriage, and cables drivably connecting said second drive mechanism with said carriage and being operatively connected with said coupler.

9. In storage apparatus, the combination of a wheeled load-carrying platform adapted to roll along a plurality of predetermined paths and to be traversed from one path to another, a cross-carriage adapted to be traversed from one path to another and including jacking means operable to lift said platform and support it upon said carriage while said carriage is so traversed, one reciprocable drive mechanism drivably engageable with said platform, another reciprocable drive mechanism drivably connected to said carriage, actuating means for said jacking means, and a cable connected to said first reciprocable drive mechanism and rotatively connected to said actuating means.

10. In storage apparatus, the combination of a plurality of wheeled load-carrying platforms each having a transversely extending member with a vertical portion, said platforms being adapted to be rolled along a plurality of ranks extending lengthwise of said apparatus and to be traversed from one rank to another, a cross-carriage adapted to be traversed from one rank to another and dimensioned to fit beneath one of said platforms, one drive means for moving said platforms along said ranks, another drive means for traversing said cross-carriage from one rank to another, a coupler associated with said first drive means and selectively engageable with and disengageable from said platforms in one of said ranks, and means included in said cross-carriage traverse driving means for actuating said coupler, said cross-carriage being so constructed and arranged as to contact said vertical portion of said transversely extending member of one of said platforms while said carriage moves or lies beneath said platform, whereby said platform is substantially blocked against movement in a direction lengthwise of said ranks while said carriage moves or lies beneath said platform.

11. In storage apparatus including a plurality of load-carrying platforms in and adapted to be moved along each of a plurality of ranks, the combination of a cross-carriage adapted to be traversed from one said rank to another along a predetermined path, means for alternately loading at least one of said platforms at a time onto and unloading the same from said cross-carriage, said loading and unloading occurring perpendicularly both to said ranks and to said traverse path and occurring while the platforms affected are in one of said ranks and are longitudinally stationary therein, and common power drive means constructed and arranged for operating said loading and unloading means while said carriage lies in the same rank with said longitudinally stationary platforms and simultaneously moving others of said platforms in another of said ranks along the latter rank.

12. In storage apparatus, the combination of a plurality of wheeled load-carrying platforms adapted to be rolled along a plurality of ranks extending lengthwise of said apparatus, a cross-carriage adapted to be traversed from one rank to another along a cross path intersecting said ranks, said carriage being dimensioned to fit beneath any of said platforms, and said ranks and said cross path being substantially coplanar in the vicinity of their said intersections, traverse driving means drivably connected to said carriage and adapted to effect said traverse, jacking means mounted on said carriage and adapted to lift any of said platforms above the level at which it normally rests and there to support it upon said carriage during said traverse, said jacking means also being adapted to lower said platform, after said traverse, to the level at which it normally rests, and actuating means operably connected to said jacking means and including a rotatable drive shaft journaled upon said cross-carriage and operatively connected with said jacking means, a first rotatable clutch member mounted on an end of said shaft, and rotatable means fixed at the corresponding end of the traverse of said carriage and beyond said ranks, said last rotatable means being aligned with said shaft and including a second rotatable clutch member, and said second clutch member being axially engageable with said shaft whereby to rotate the same when so engaged.

13. A combination in accordance with claim 12, in which said rotatable means also includes a rotatable drum operatively connected to said second clutch member, and said actuating means for said jacking means also includes reciprocable drive means having a rotative connection to said drum.

14. A combination in accordance with claim 12, in which said rotatable means also includes a rotatable drum operatively connected to said second clutch member, and in which said actuating means for said jacking means also includes a cable having a portion wrapped around said drum and other portions extending away from said drum, and a reciprocably driven member to which the ends of said extending cable portions are fixed, whereby as said reciprocable member moves in either direction said extending cable portions are drawn in corresponding directions and said drum is rotated in a corresponding sense, said jacking means being thereby raised or lowered when said first and second rotatable clutch members are so engaged with one another.

15. In storage apparatus, the combination of a plurality of wheeled load-carrying platforms adapted to be rolled along a plurality of ranks extending lengthwise of said apparatus, each of said platforms having a longitudinally extending portion, a cross-carriage adapted to be traversed from one rank to another and dimensioned to fit beneath any of said platforms, traverse driving means drivably connected to said carriage and adapted to effect said traverse, a plurality of jack shoes pivoted upon said carriage and swingable in a vertical plane and so disposed upon said carriage as to be liftably engageable with any of said platforms when said carriage lies beneath it, and actuating means operably connected to said jack shoes and being so constructed and arranged that, when said shoes are in raised position, they support said platform above the level at which it normally rests so that it is free to be traversed from one rank to another while so supported, and when said shoes are in lowered position, said platform rests at its normal level and is free of said carriage, said actuating means comprising a reversible toggle mechanism, a plurality of thrust bars drivably connected to said toggle mechanism, one of said bars being associated with each said jack shoe and being reciprocable by means of said mechanism in a plane parallel with the swinging plane of its associated jack shoe, a transverse synchronizing shaft interconnecting a plurality of said thrust bars, and a jack link pivoted at one end thereof to each of said thrust bars and carrying at another point thereof a shaft upon which said associated jack shoe is also pivoted, said latter pivot of said shoe being spaced from its said pivot upon said carriage, whereby operation of said toggle mechanism in either direction raises or lowers said shoes in unison.

16. In storage apparatus, the combination of a plurality of wheeled load-carrying platforms adapted to be rolled along a plurality of ranks extending lengthwise of said apparatus, each of said platforms having a longitudinally extending portion, a cross-carriage adapted to be traversed from one rank to another and dimensioned to fit beneath any of said platforms, traverse driving means drivably connected to said carriage and adapted to effect said traverse, a plurality of jack shoes pivoted upon said carriage and swingable in a vertical plane and so disposed upon said carriage as to be liftably engageable with any of said platforms when said carriage lies beneath it, and actuating means operably connected to said jack shoes and being so constructed and arranged that, when said shoes are in raised position, they support said platform above the level at which it normally rests so that it is free to be traversed from one rank to another while so supported, and when said shoes are in lowered position, said platform rests at its normal level and is free of said carriage, said actuating means comprising a reversible toggle mechanism, a plurality of thrust bars drivably connected to said toggle mechanism, one of said bars being associated with each said jack shoe and being reciprocable by means of said mechanism in a plane parallel with the swinging plane of its associated jack shoe, and a jack link pivoted at one end thereof to each of said thrust bars and carrying at another point thereof a shaft upon which said associated jack shoe is also pivoted, said latter pivot of said shoe being spaced from its said pivot upon said carriage, whereby operation of said toggle mechanism in either direction raises or lowers said shoes in unison, each of said jack links including a portion extending lengthwise of said link and beyond said shaft to which said associated jack shoe is pivoted, said link being so disposed with respect to said platform, when said cross-carriage lies beneath said platform, that said extending portion of said link is adapted to rise alongside said longitudinally extending portion of said platform when said jack shoes are raised and said carriage lies beneath said platform, whereby said platform is substantially blocked against transverse motion relative to said carriage.

17. In storage apparatus, the combination of a wheeled load-carrying platform adapted to be rolled along a plurality of ranks extending lengthwise of said apparatus and to be traversed from one rank to another, a cross-carriage adapted to be traversed from one rank to another and dimensioned to fit beneath said platform, a reciprocable drive mechanism, a plurality of driving means connected from said mechanism to said carriage, each of said driving means being connected to said carriage at a place which, when said carriage moves in the direction in which said last means is adapted to drive it, is adjacent to what is then the trailing side of said carriage, each of said driving means leading from its connection with said carriage to a place between said ranks and adjacent the rank toward which it is adapted to drive said carriage, and leading thence away from said last mentioned rank to said reciprocable drive mechanism, and a track defining the path of said platform along each rank, said cross-carriage driving means including a pair of drive cables and a fair-lead for each of said cables, said fair-leads being disposed in the cross-over traversed by said carriage and in the inter-rank space between a pair of said rank tracks, and said fair-leads being disposed on opposite sides of said inter-rank space, said reciprocable drive mechanism being adapted to draw one of said cables and said carriage in one direction when operated in one direction, and adapted to draw the other of said cables and said carriage in another direction when operated in another direction, the fair-lead for each said cable lying on that side of said inter-rank space toward which that cable is adapted to draw said carriage.

References Cited in the file of this patent

UNITED STATES PATENTS

| | | |
|---|---|---|
| 722,166 | Taft | Mar. 3, 1903 |
| 869,689 | Brown | Oct. 29, 1907 |
| 904,919 | Baldwin | Nov. 24, 1908 |
| 1,423,947 | Kramer et al. | July 25, 1922 |
| 1,425,965 | Hocke | Aug. 15, 1922 |
| 1,478,676 | Richey | Dec. 25, 1923 |
| 1,584,080 | Dinkelberg | May 11, 1926 |
| 1,591,655 | Callison | July 6, 1926 |
| 1,667,023 | Baxter | Apr. 24, 1928 |
| 1,734,065 | Werotte | Nov. 5, 1929 |
| 1,749,324 | Craig | Mar. 4, 1930 |
| 1,775,799 | Young | Sept. 16, 1930 |
| 1,807,597 | Lowenstein | June 2, 1931 |
| 1,851,502 | Ferris et al. | Mar. 29, 1932 |
| 1,887,667 | Wheeler | Nov. 15, 1932 |
| 1,985,169 | Howell et al. | Dec. 18, 1934 |
| 2,004,438 | Judd | June 11, 1935 |
| 2,009,579 | Ewend | July 30, 1935 |
| 2,022,167 | Wheeler | Nov. 26, 1935 |
| 2,023,410 | Davis et al. | Dec. 10, 1935 |
| 2,201,939 | Auger et al. | May 21, 1940 |
| 2,216,637 | Auger et al. | Oct. 1, 1940 |
| 2,447,559 | Bloemers | Aug. 24, 1948 |
| 2,560,797 | Humphreys | July 17, 1951 |